United States Patent
Muller

(10) Patent No.: US 9,315,086 B2
(45) Date of Patent: Apr. 19, 2016

(54) RECREATIONAL UTILITY VEHICLE

(71) Applicant: Detroit Engineering Inc., Holly, MI (US)

(72) Inventor: Christopher Muller, Holly, MI (US)

(73) Assignee: Detroit Engineering, Inc., Holly, MI (US)

( * ) Notice: Subject to any disclaimer, the term of this patent is extended or adjusted under 35 U.S.C. 154(b) by 0 days.

(21) Appl. No.: 14/451,328

(22) Filed: Aug. 4, 2014

(65) Prior Publication Data

US 2016/0031283 A1 Feb. 4, 2016

Related U.S. Application Data

(63) Continuation-in-part of application No. 13/444,935, filed on Apr. 12, 2012, now Pat. No. 8,794,641.

(51) Int. Cl.
| | |
|---|---|
| *B60G 17/00* | (2006.01) |
| *B60P 3/32* | (2006.01) |
| *B60G 17/005* | (2006.01) |
| *B60P 3/39* | (2006.01) |
| *B60D 1/06* | (2006.01) |
| *B60F 3/00* | (2006.01) |

(52) U.S. Cl.
CPC *B60G 17/00* (2013.01); *B60D 1/06* (2013.01); *B60F 3/0069* (2013.01); *B60G 17/005* (2013.01); *B60P 3/32* (2013.01); *B60P 3/39* (2013.01)

(58) Field of Classification Search
CPC ........ B60G 17/00; B60G 17/005; B60D 1/06; B60F 3/0069; B60P 3/32
See application file for complete search history.

(56) References Cited

U.S. PATENT DOCUMENTS

| | | | | |
|---|---|---|---|---|
| 3,351,373 | A * | 11/1967 | Christin | 296/172 |
| 4,241,803 | A * | 12/1980 | Lauber | 180/8.1 |
| 4,958,584 | A * | 9/1990 | Williamson | 440/12.52 |
| 6,036,201 | A * | 3/2000 | Pond et al. | 280/5.514 |
| 6,308,962 | B1 * | 10/2001 | Ishikawa et al. | 280/5.514 |
| 6,505,694 | B2 * | 1/2003 | Maguire | 180/9.1 |
| 6,808,430 | B1 * | 10/2004 | March | 440/12.52 |
| 6,899,191 | B1 * | 5/2005 | Lykken | 180/182 |
| 6,962,359 | B2 * | 11/2005 | Huhmarkangas et al. | 280/124.134 |
| 8,485,541 | B2 * | 7/2013 | Pozio | 280/124.136 |
| 8,602,137 | B2 * | 12/2013 | Kroese et al. | 180/41 |
| 8,794,641 | B2 * | 8/2014 | Muller | 280/6.153 |
| 8,888,495 | B2 * | 11/2014 | Johnson et al. | 434/219 |
| 9,004,499 | B2 * | 4/2015 | Zeweke et al. | 280/5.514 |
| 2002/0084123 | A1 * | 7/2002 | Farsdale | B60F 5/00 180/182 |

(Continued)

*Primary Examiner* — Paul N Dickson
*Assistant Examiner* — Timothy Wilhelm
(74) *Attorney, Agent, or Firm* — Buckert Patent & Trademark Law Firm, PC; John F. Buckert

(57) ABSTRACT

A recreational utility vehicle having an enclosure with a bottom wall and first and second side wall assemblies is provided. The first and second side wall assemblies and the bottom wall define an interior region. The vehicle further includes a first suspension assembly coupled directly to the first side wall assembly, having a first swing arm assembly with a first operational position in which a first portion of the bottom wall of the enclosure is at a predetermined distance from a ground level elevation. The first swing arm assembly has a second operational position in which the first portion of the bottom wall of the enclosure is at the ground level elevation. The vehicle further includes a second suspension assembly operably coupled directly to the second side wall assembly.

22 Claims, 28 Drawing Sheets

(56) References Cited

U.S. PATENT DOCUMENTS

2006/0172627 A1* 8/2006 Gibbs et al. .................. 440/12.5
2007/0045036 A1* 3/2007 Takeuchi et al. .............. 180/411
2011/0275256 A1* 11/2011 Gibbs et al. ................ 440/12.51

* cited by examiner

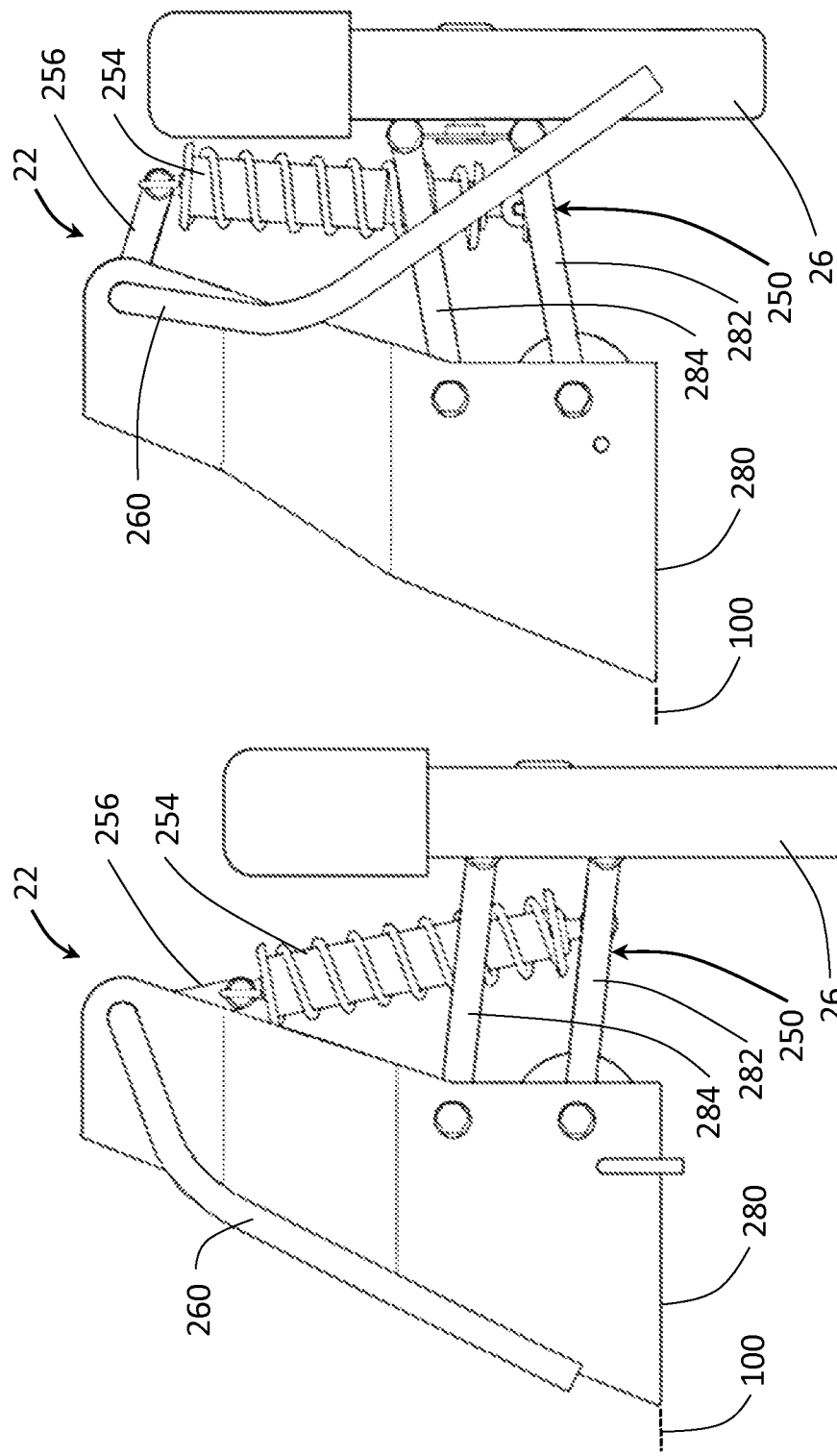

RECREATIONAL UTILITY VEHICLE

CROSS-REFERENCE TO RELATED APPLICATIONS

This application is a continuation-on-part of U.S. patent application Ser. No. 13/444,935 filed on Apr. 12, 2012, the entire contents of which are hereby incorporated by reference herein.

BACKGROUND

The inventor herein has recognized a need for an improved recreational utility vehicle.

SUMMARY

A recreational utility vehicle in accordance with an exemplary embodiment is provided. The recreational utility vehicle include an enclosure having a bottom wall, a first side wall assembly, and a second side wall assembly. The first and second side wall assemblies and the bottom wall define an interior region. The recreational utility vehicle further include a first suspension assembly coupled directly to the first side wall assembly. The first suspension assembly has a first swing arm assembly with a first operational position in which a first portion of the bottom wall of the enclosure is selectively maintained at a first predetermined distance from a ground level elevation. The first swing arm assembly has a second operational position in which the first portion of the bottom wall of the enclosure is selectively maintained at the ground level elevation. The recreational utility vehicle further includes a second suspension assembly coupled directly to the second side wall assembly. The second suspension assembly has a second swing arm assembly with a first operational position in which a second portion of the bottom wall of the enclosure is selectively maintained at the first predetermined distance from the ground level elevation. The second swing arm assembly has a second operational position in which the second portion of the bottom wall of the enclosure is selectively maintained at the ground level elevation.

BRIEF DESCRIPTION OF THE DRAWINGS

FIG. 16 is a side view of the first suspension assembly and the first wheel when the bottom wall of the recreational utility vehicle of FIG. 1 is at the first predetermined distance from the ground level elevation;

FIG. 17 is a side view of the first suspension assembly and the first wheel when the bottom wall of the recreational utility vehicle of FIG. 1 is at an intermediate distance from the ground level elevation;

DETAILED DESCRIPTION

Figure 1:
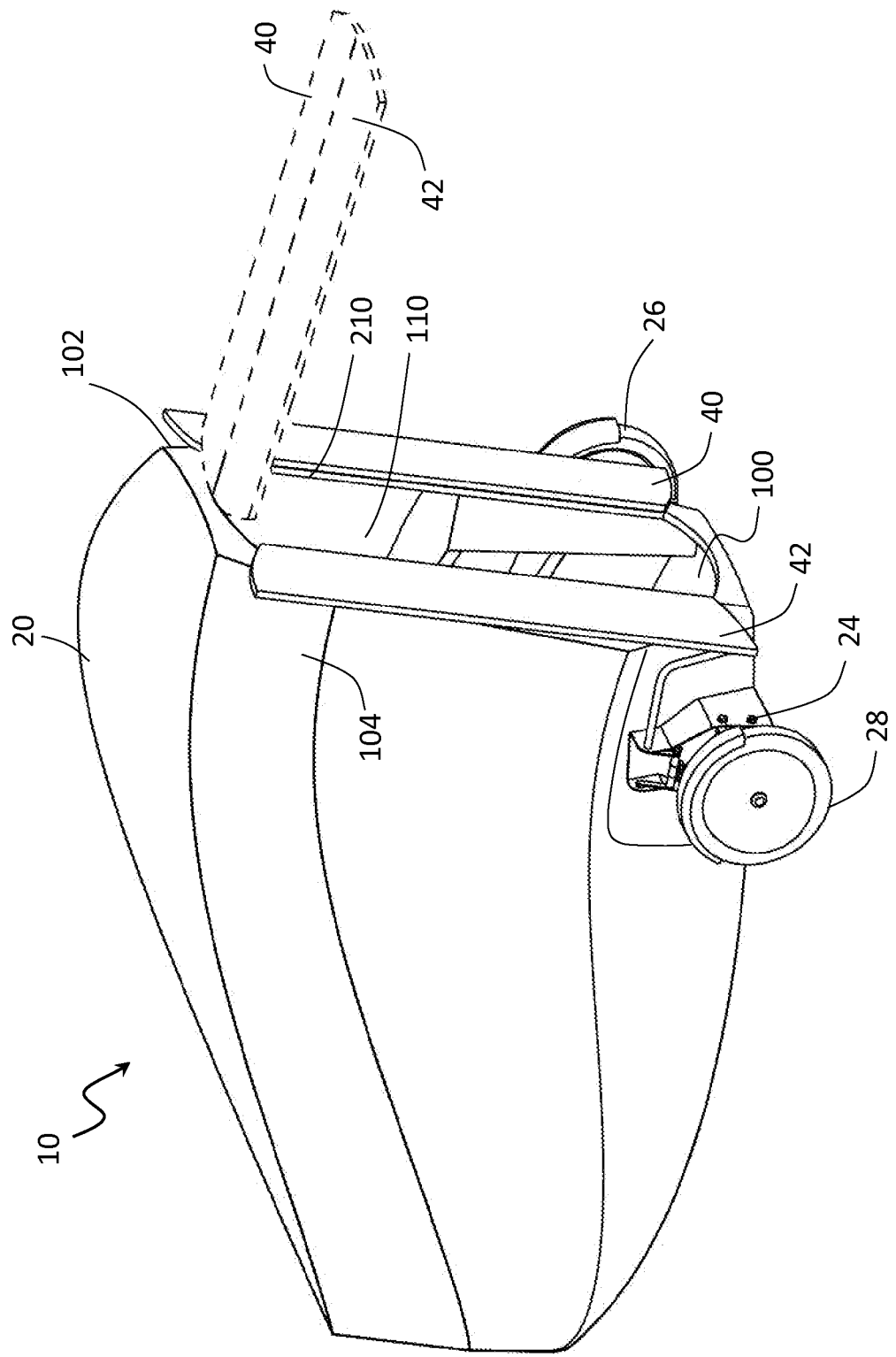
FIG. 1 is a schematic of a recreational utility vehicle in accordance with an exemplary embodiment.

Referring to FIGS. 1-3 and 27, a recreational utility vehicle 10 in accordance with an exemplary embodiment is provided. The recreational utility vehicle 10 includes an enclosure 20, first and second suspension assemblies 22, 24, wheels 26, 28, doors 40, 42, first and second partition walls 44, 46, a bed assembly 48, a chair 50, shelf assemblies 52, 54, a closet assembly 56, and a coupler assembly 58. An advantage of the recreational utility vehicle 10 is that the vehicle 10 has a first operational position in which the enclosure 20 is disposed a predetermined distance from the ground level elevation for transporting the vehicle 10, and a second operational position in which the enclosure 20 is disposed at the ground level elevation for stationary use of the vehicle 10. In particular, when the enclosure 20 is disposed on the ground at the ground level elevation, the enclosure 20 is further stabilized for having an occupant occupy and sleep within the enclosure 20.

For purposes of understanding, the term "ground engaging member" is defined as any member or component that is coupled to a suspension assembly that is utilized to assist the movement of the recreational utility vehicle from one position to another position. For example, a ground engaging member can comprise one of a wheel, a pontoon, and a ski. Further, a pontoon can be utilized to transport the recreational utility vehicle on and across water, snow, or ice.

Figure 2:
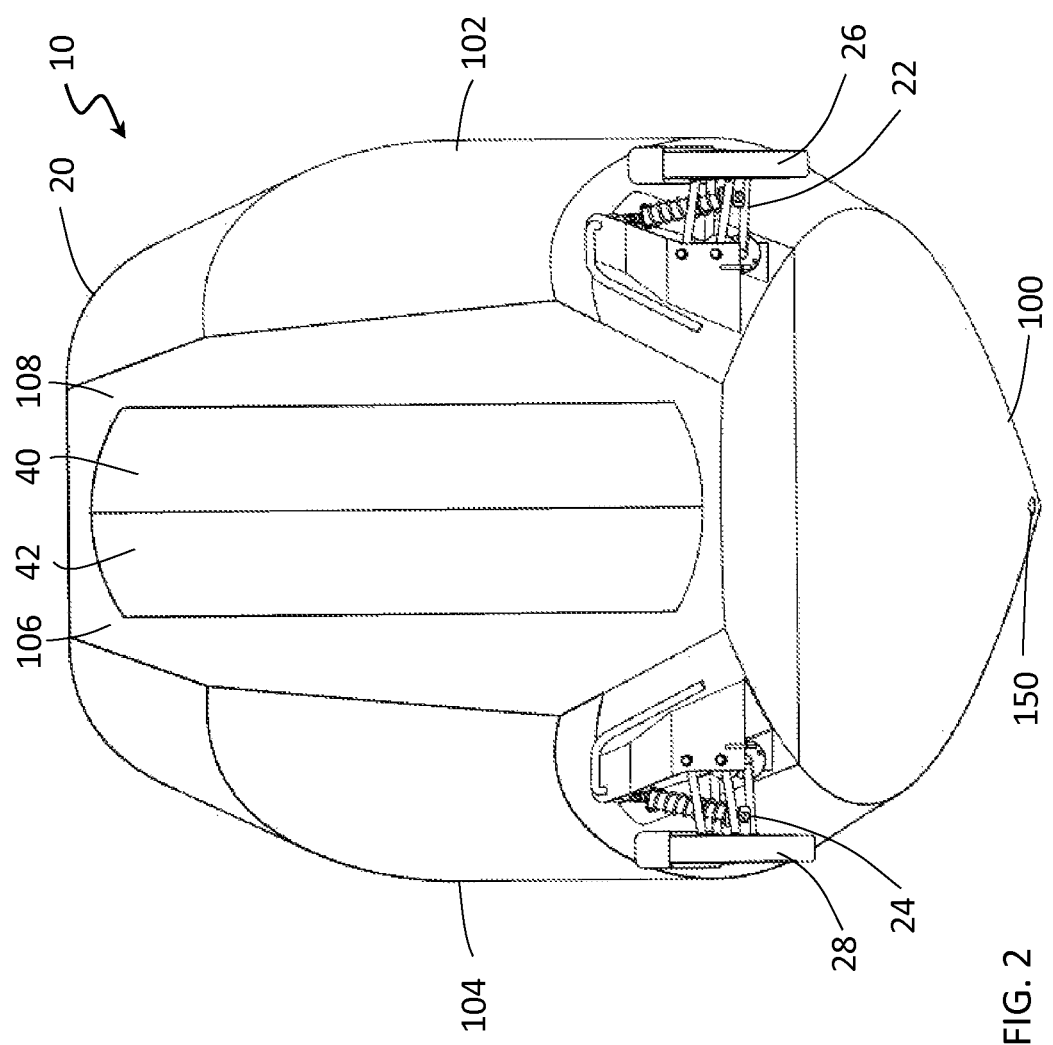
FIG. 2 is a rear tilted view of the recreational utility vehicle of FIG. 1.
Figure 3:
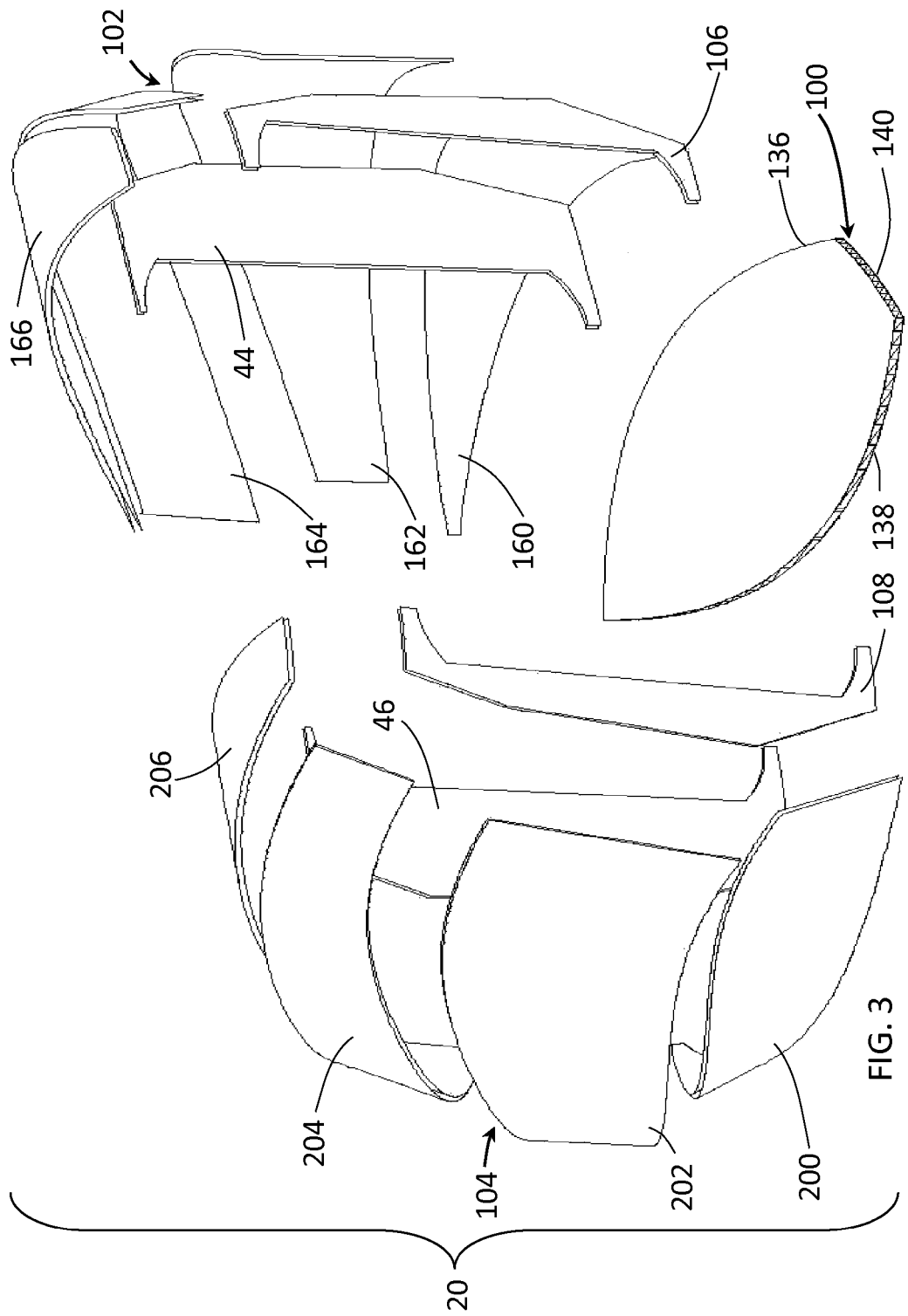
FIG. 3 is an exploded view of an enclosure utilized in the recreational utility vehicle of FIG. 1.
Figure 4:
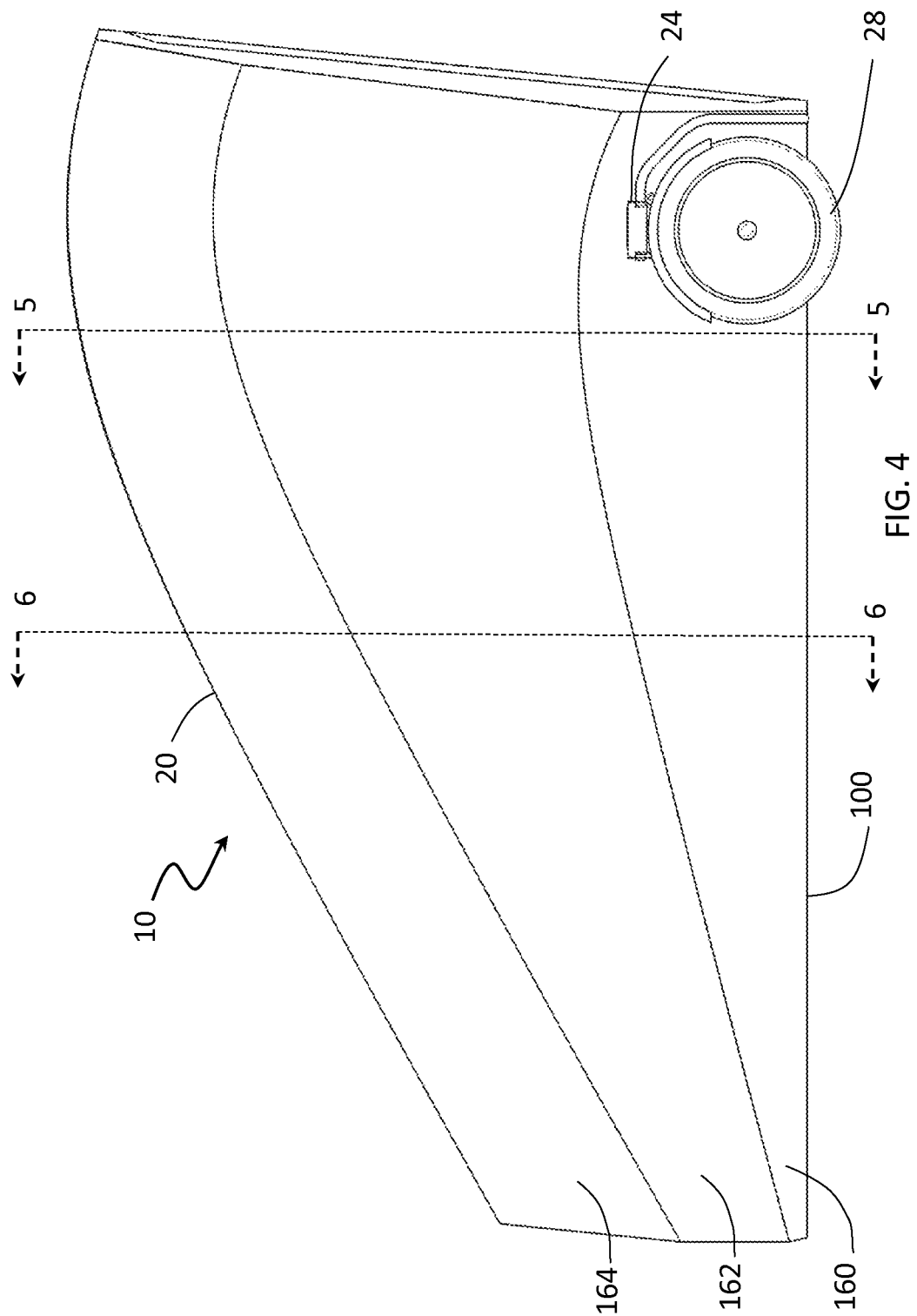
FIG. 4 is a side view of the recreational utility vehicle of FIG. 1 in which a bottom wall of the recreational utility vehicle is at a first predetermined distance from a ground level elevation.
Figure 5:
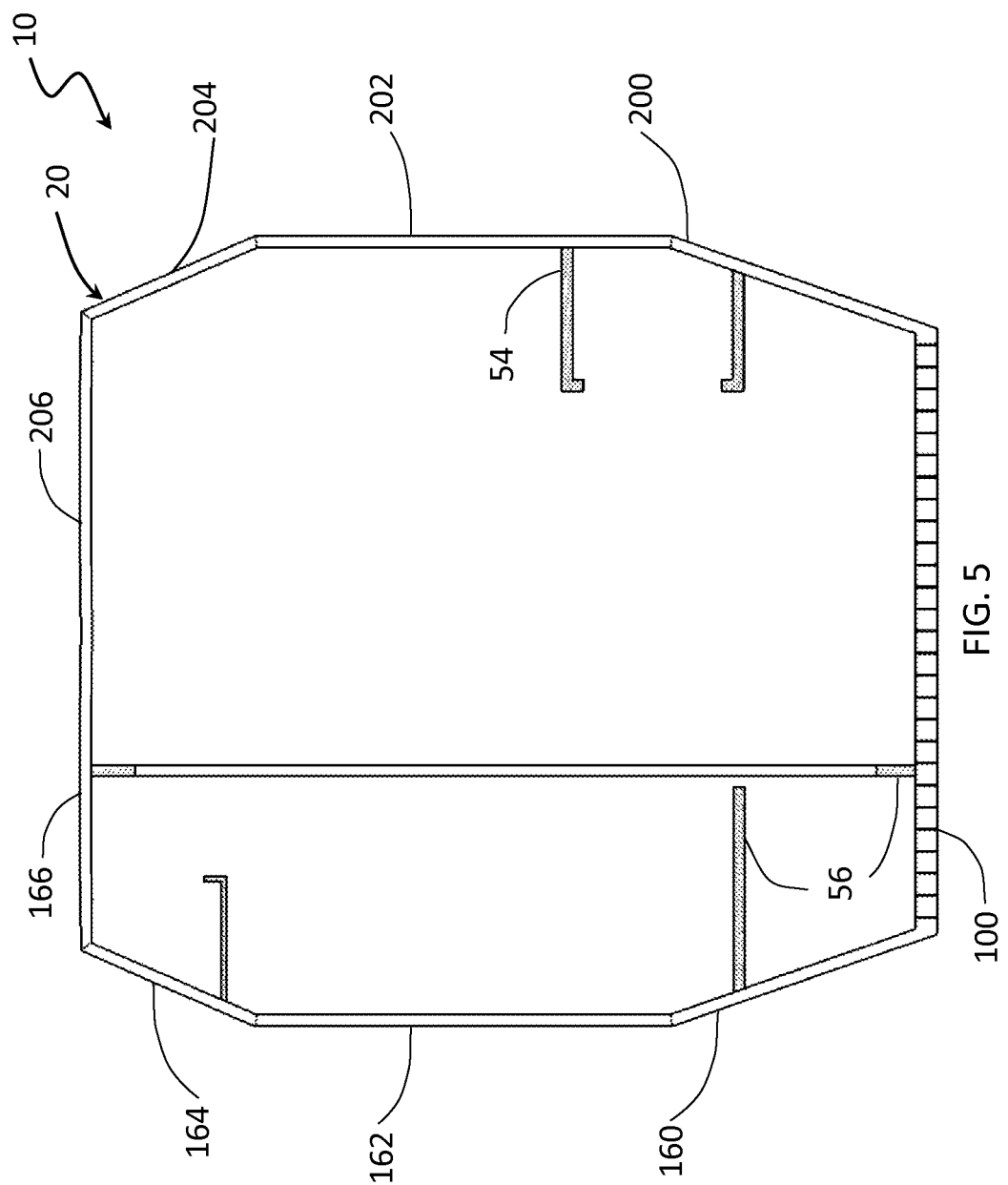
FIG. 5 is a cross-sectional view of the recreational utility vehicle of FIG. 1 taken along lines 5-5.
Figure 6:
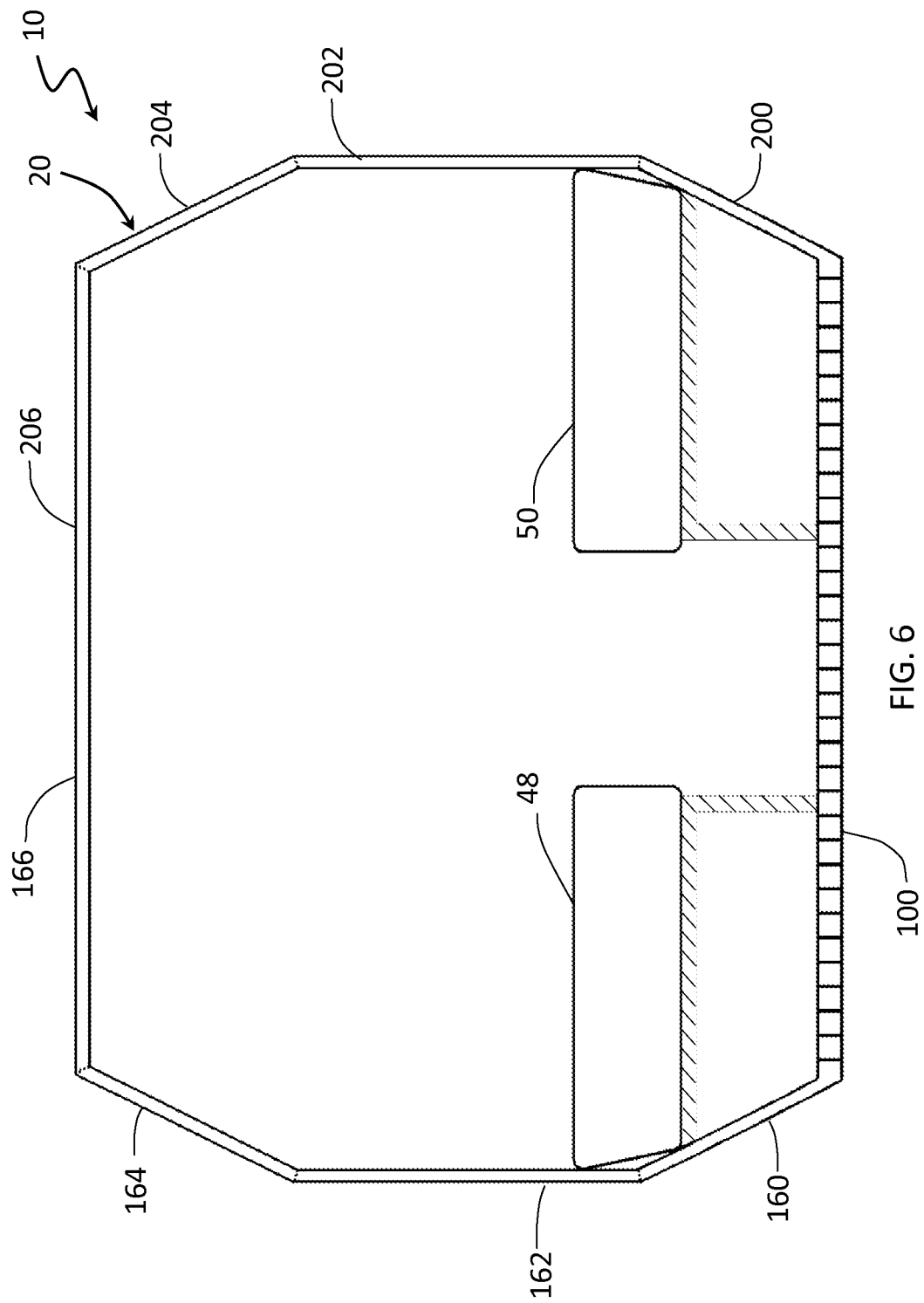
FIG. 6 is another cross-sectional view of the recreational utility vehicle of FIG. 1 taken along lines 6-6.
Figure 7:
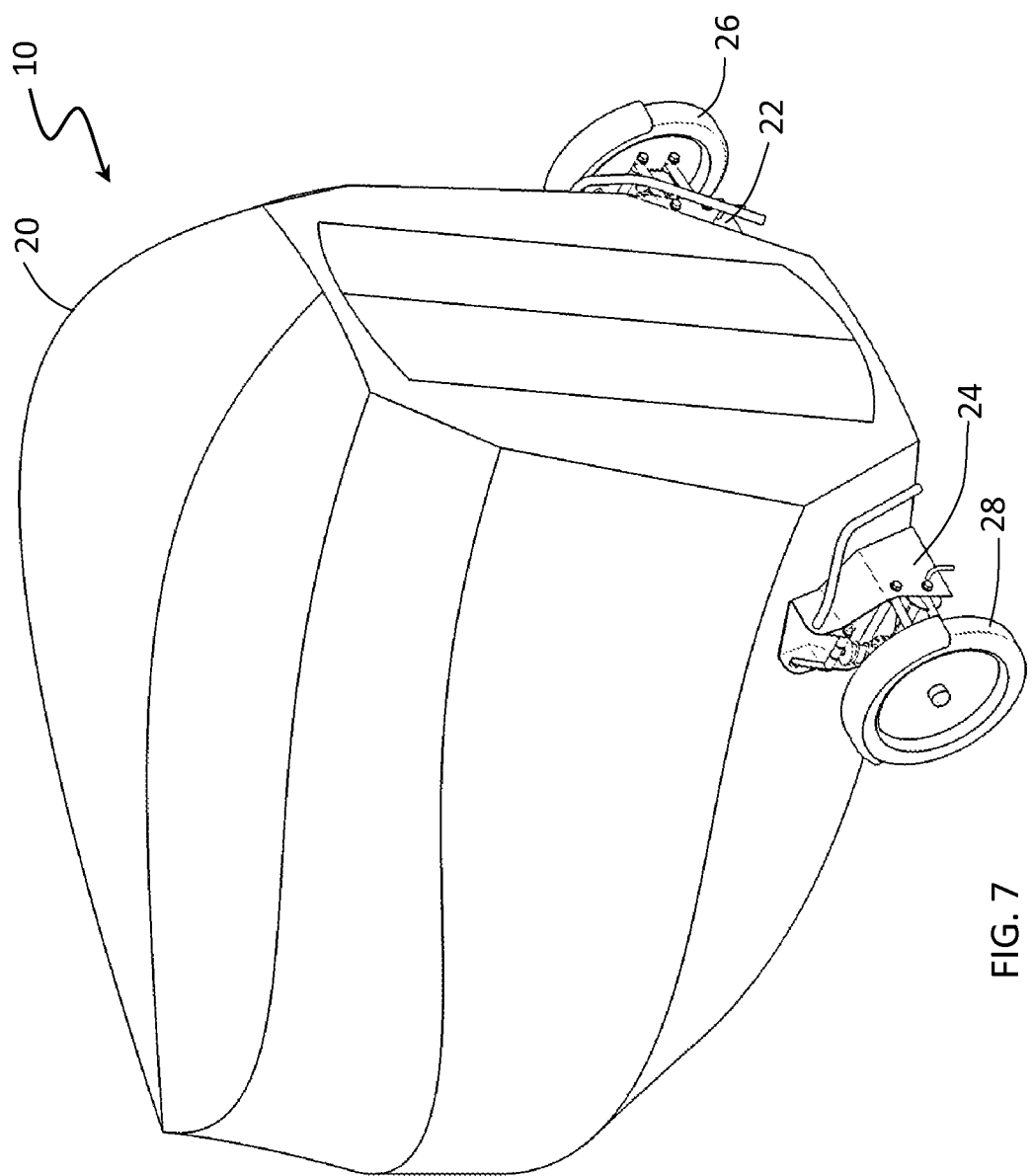
FIG. 7 is another view of the recreational utility vehicle of FIG. 1 in which the bottom wall of the recreational utility vehicle is at the first predetermined distance from the ground level elevation.

Referring to FIGS. 1-3, the enclosure 20 includes a bottom wall 100, a first side wall assembly 102, and a second side wall assembly 104, and rear wall panels 106, 108. The first and second side wall assemblies 102, 104 are coupled to the bottom wall 100 and define an interior region or space 110. The interior region 110 is sized and shaped to allow at least two human occupants to occupy the interior region 110.

The bottom wall 100 includes peripheral edge portions 136, 138, 140 encompassing a periphery of the bottom wall 100. The bottom wall 100 further includes a ball-hitch receiving aperture 150 extending from a bottom surface of the bottom wall 100 into the bottom wall 100. The ball-hitch receiving aperture 150 being sized and shaped to receive a ball member attached to a motorized vehicle (e.g., a car, SUV, or a truck) for coupling the recreational utility vehicle 10 to the motorized vehicle. In an exemplary embodiment, the bottom wall 100 can be constructed utilizing one or more extruded aluminum plates.

The first side wall assembly 102 is coupled to the bottom wall 100 at the peripheral edge 136 of the bottom wall 100. The first side wall assembly 102 includes wall portions 160, 162, 164, 166. The wall portion 160 is coupled between and to the bottom wall 100 and the wall portion 162. The wall portion 164 is coupled between and to the wall portion 162 and the wall portion 166. The wall portion 166 is further coupled to the wall portion 206 of the second side wall assembly 104. In an exemplary embodiment, each of the wall portions 160, 162, 164, 166 can be constructed utilizing two metal (e.g., aluminum) plates having a heat insulating foam disposed in a space between the two metal plates. The wall portions 160, 162, 164, 166 are mechanically fastened together. For example, the wall portions 160, 162, 164, 166 can be mechanically fastened together utilizing rivets, bolts, weld joints, adhesives, or screws.

The second side wall assembly 104 is coupled to the bottom wall 100 at the peripheral edge 138 of the bottom wall 100. The second side wall assembly 104 includes wall portions 200, 202, 204, 206. The wall portion 200 is coupled between and to the bottom wall 100 and the wall portion 202. The wall portion 204 is coupled between and to the wall portion 202 and the wall portion 206. The wall portion 206 is further coupled to the wall portion 166 of the first side wall assembly 102. In an exemplary embodiment, each of the wall portions 200, 202, 204, 206 can be constructed utilizing two metal (e.g., aluminum) plates having a heat insulating foam disposed in a space between the two metal plates. The wall portions 200, 202, 204, 206 are mechanically fastened together. For example, the wall portions 200, 202, 204, 206 can be mechanically fastened together utilizing rivets, bolts, weld joints, adhesives, or screws.

The rear wall panels 106, 108 are coupled to the first and second side wall assemblies 102, 104, respectively. The rear wall panels 106, 108 define the doorway 210 therebetween that is sized and shaped to allow a human occupant to enter the interior region 110 of the enclosure 20.

Referring to FIGS. 1-12 and 15, the first suspension assembly 22 is coupled directly to the first side wall assembly 102. In an exemplary embodiment, the first suspension assembly 22 includes a swing arm assembly 250, an axle pin 252, a strut assembly 254, a rotatable yoke member 256, a locking pin 258, a handle 260, and a locking pin 262.

Referring to FIGS. 4, 7, 8 and 16, the swing arm assembly 250 has a first operational position in which a portion of the bottom wall 100 of the enclosure 20 proximate to the swing arm assembly 250 is locked at a first predetermined distance from a ground level elevation utilizing the locking pin 262. The locking pin 262 is disposed through the apertures 356, 366 of the mounting bracket 280 to lock the swing arm assembly 250 at the first operational position, for stationary use of the vehicle 10. Further, referring to FIGS. 12-14 and 18, the swing arm assembly 250 has a second operational position in which a portion of the bottom wall 100 proximate to the swing arm assembly 250 is at the ground level elevation. The locking pin 262 can be removed from the apertures 356, 366 of the mounting bracket 280 when the swing arm assembly 250 has the second operational position for stationary use of the vehicle 10. Still further, referring to FIGS. 9-11 and 17, the swing arm assembly 250 has an intermediate operational position, between the first and second operational positions, in which the portion of the bottom wall 100 of the enclosure 20 proximate to the swing arm assembly 250 is above the ground level elevation. The locking pin 262 is disposed through the apertures 356, 366 of the mounting bracket 280 to lock the swing arm assembly 250 at the intermediate operational position, for stationary use of the vehicle 10. It is noted that the locking pin 262 is removed from the apertures 356, 366 of the mounting bracket 280, and the locking pin 258 has a locked operational position, when the vehicle 10 is being moved or transported by another motorized vehicle.

Figure 8:
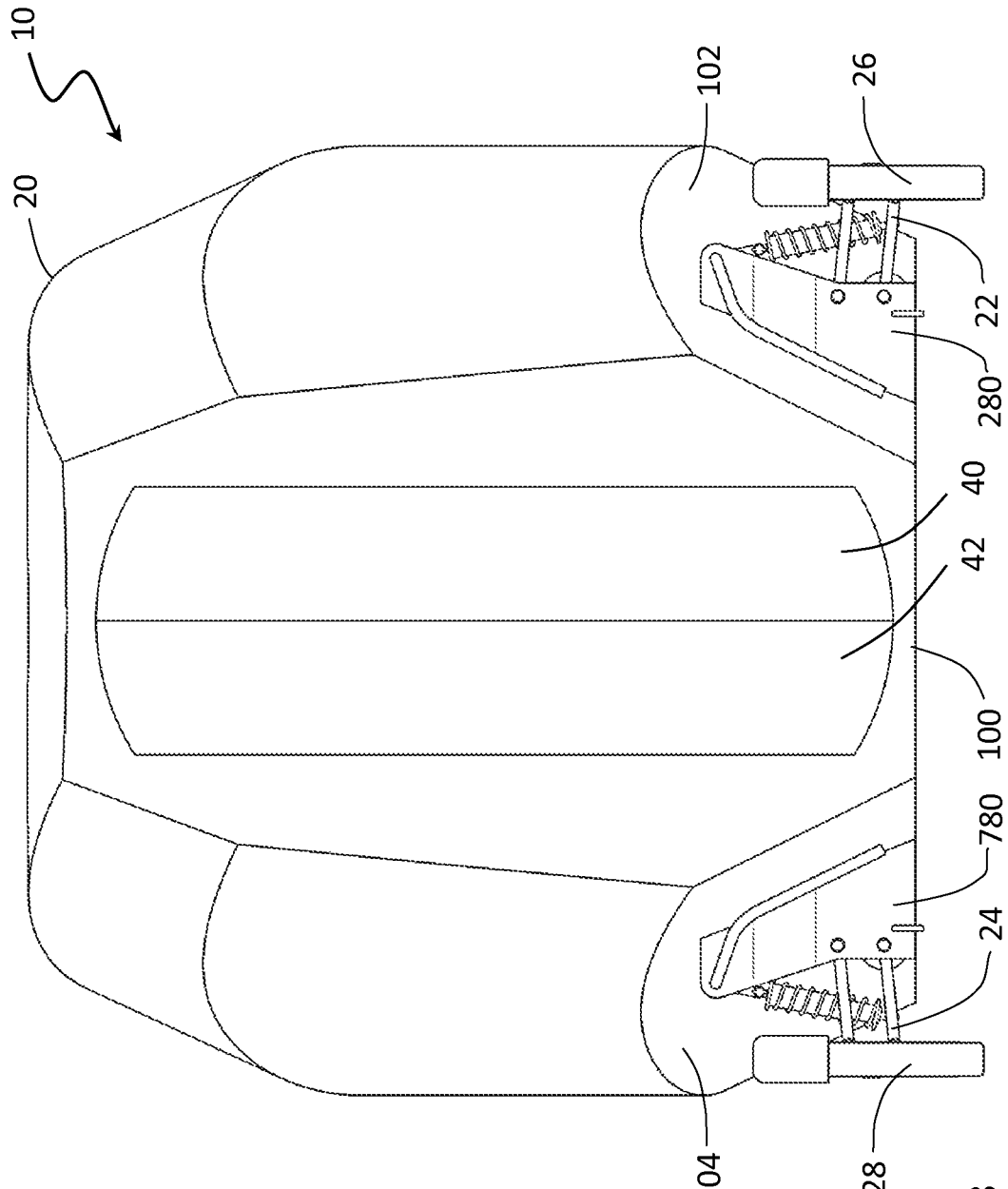
FIG. 8 is a rear view of the recreational utility vehicle of FIG. 1 in which the bottom wall of the recreational utility vehicle is at the first predetermined distance from the ground level elevation.
Figure 9:
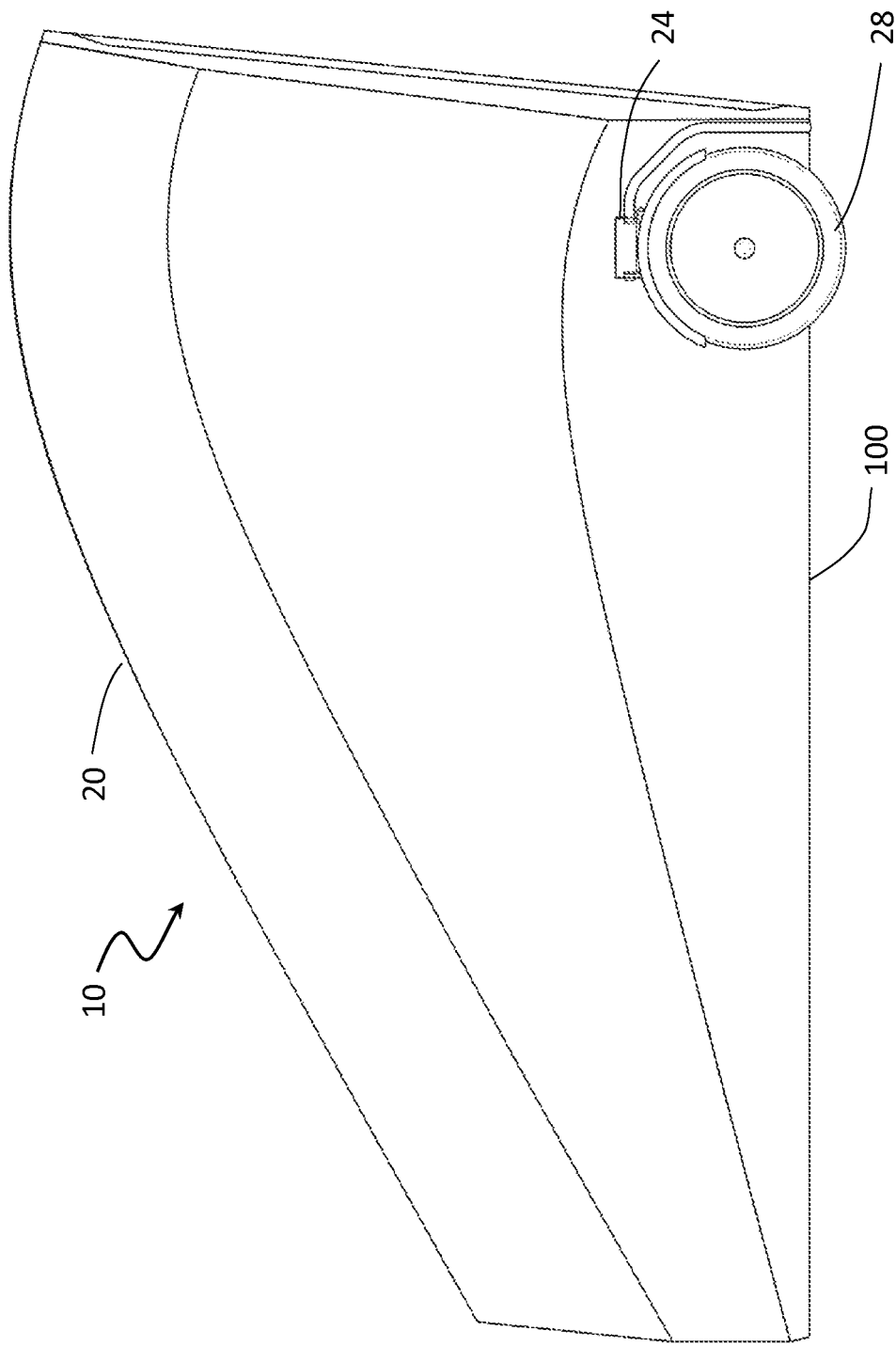
FIG. 9 is a side view of the recreational utility vehicle of FIG. 1 in which the bottom wall of the recreational utility vehicle is an intermediate distance from the ground level elevation which is less than the first predetermined distance.
Figure 10:
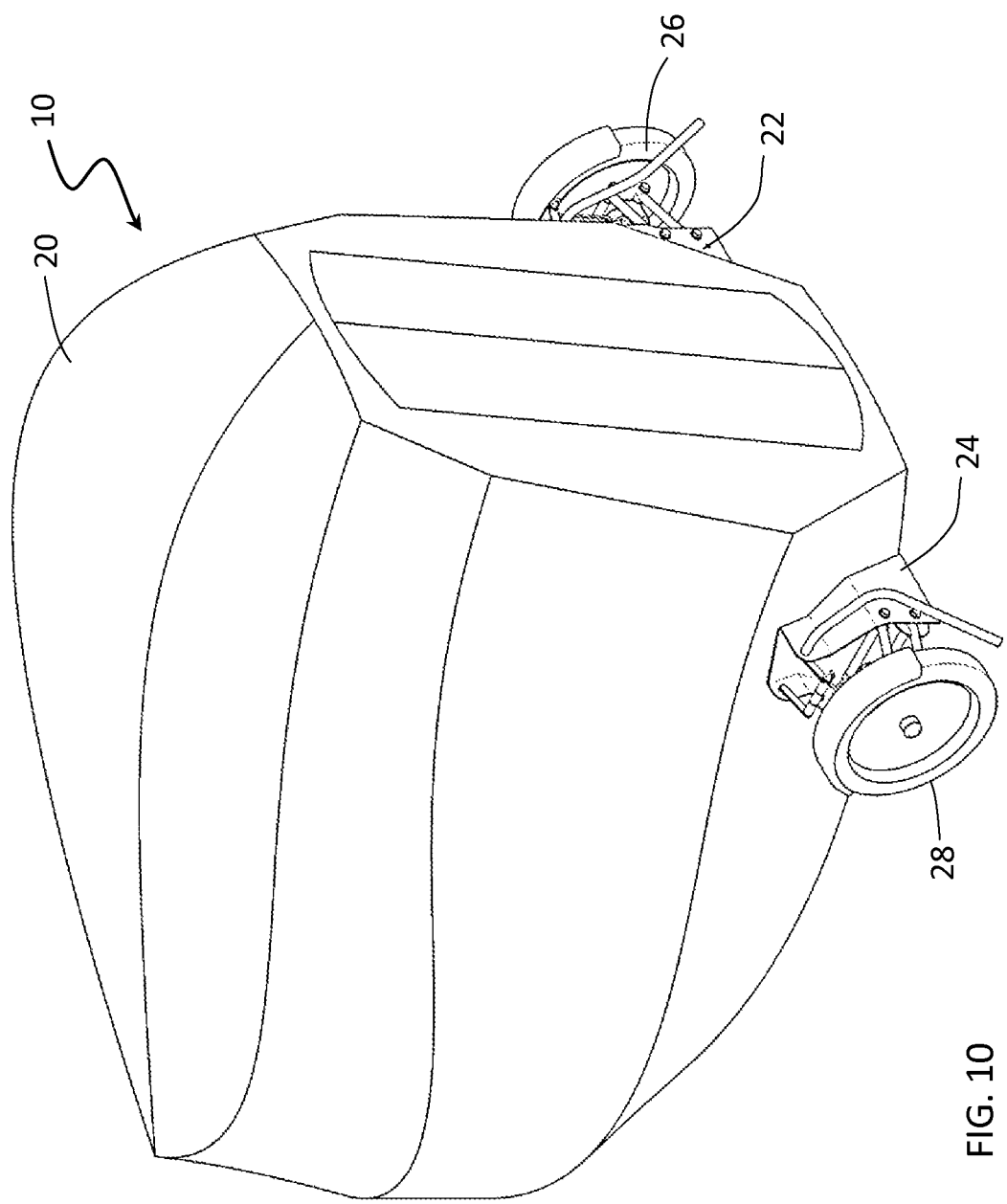
FIG. 10 is another view of the recreational utility vehicle of FIG. 1 in which the bottom wall of the recreational utility vehicle is at the intermediate distance from the ground level elevation.
Figure 11:
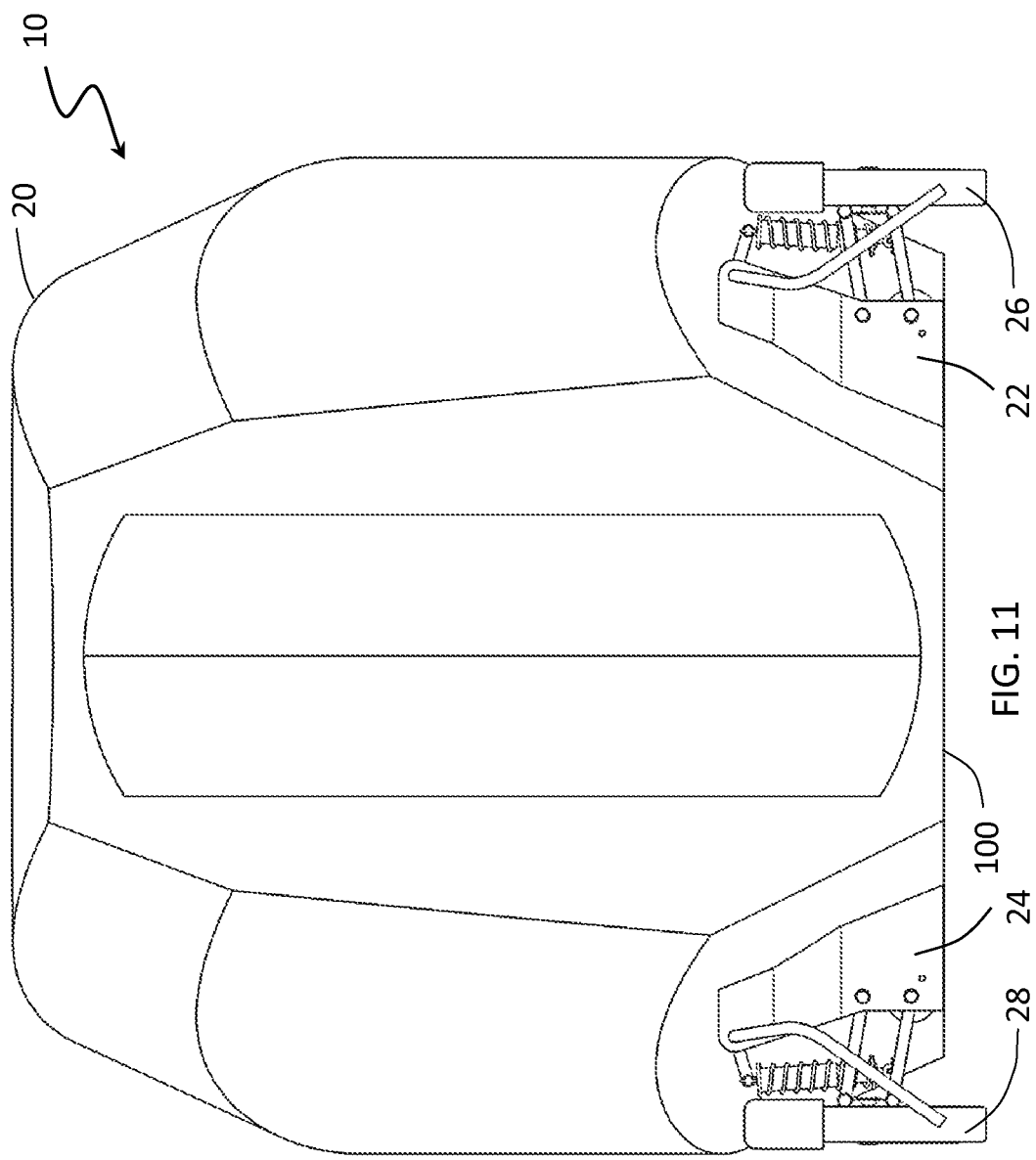
FIG. 11 is a rear view of the recreational utility vehicle of FIG. 1 in which the bottom wall of the recreational utility vehicle is at the intermediate distance from the ground level elevation.
Figure 12:
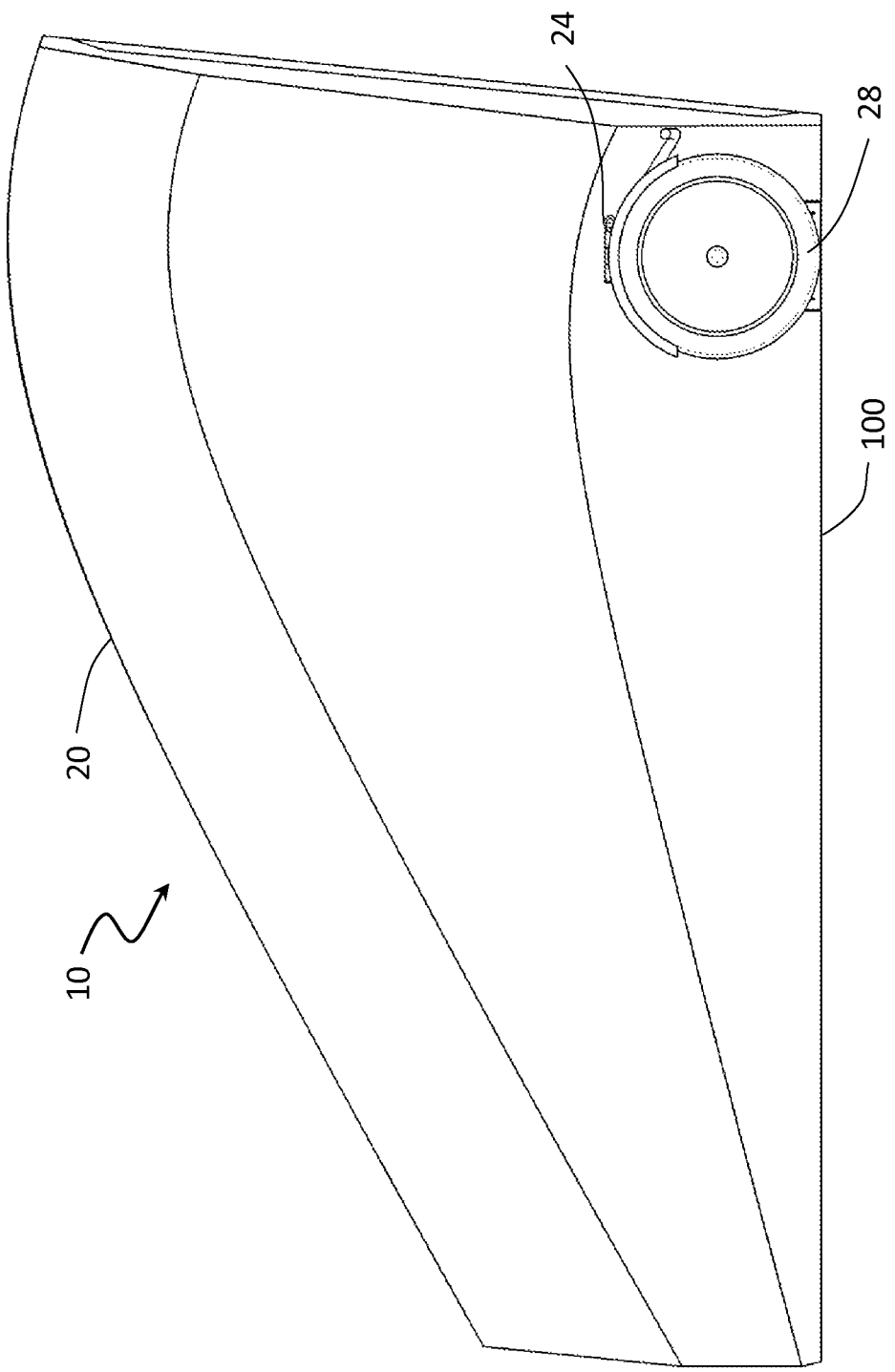
FIG. 12 is a side view of the recreational utility vehicle of FIG. 1 in which the bottom wall of the recreational utility vehicle is at the ground level elevation.
Figure 13:
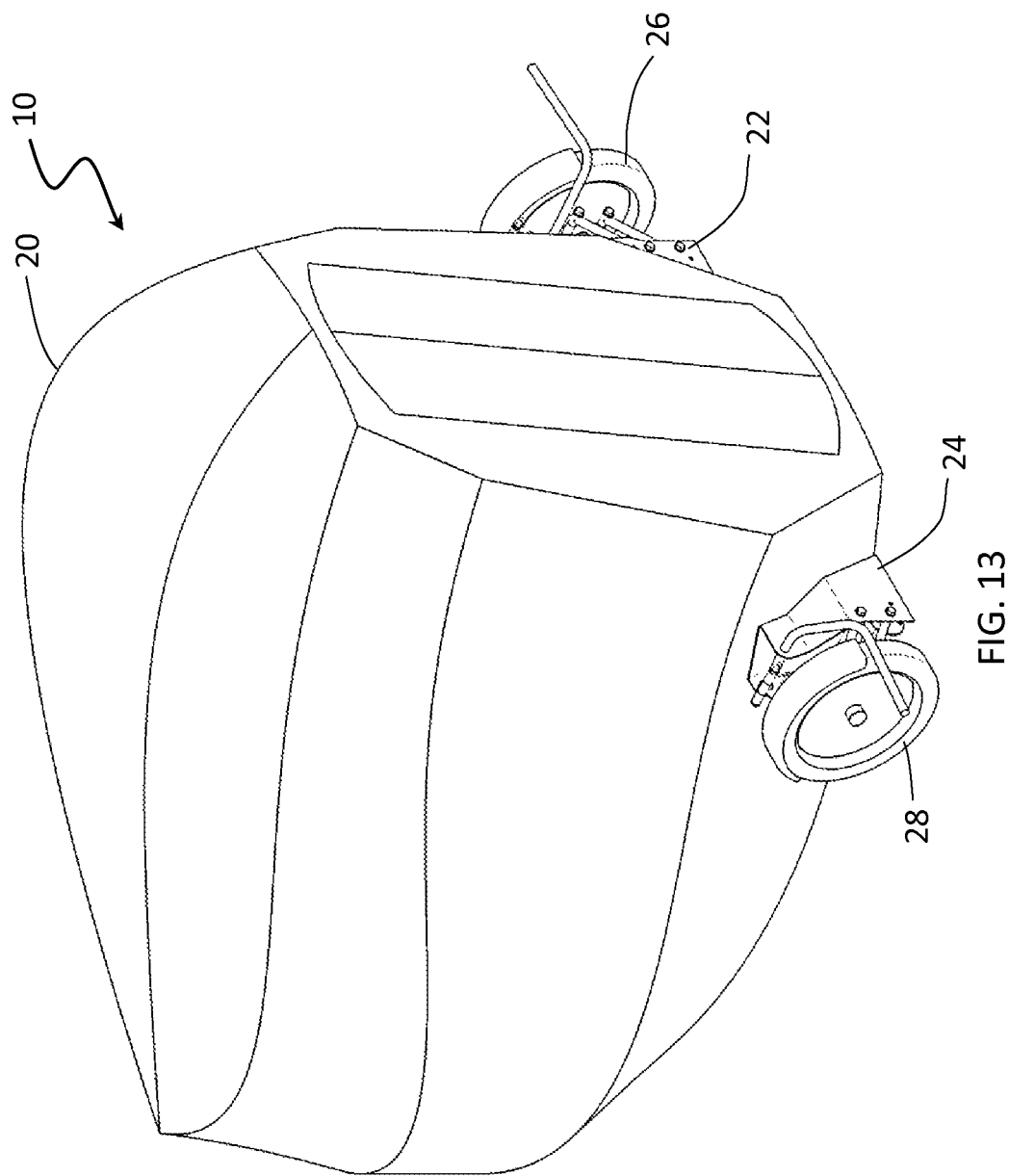
FIG. 13 is another view of the recreational utility vehicle of FIG. 1 in which the bottom wall of the recreational utility vehicle is at the ground level elevation.
Figure 14:
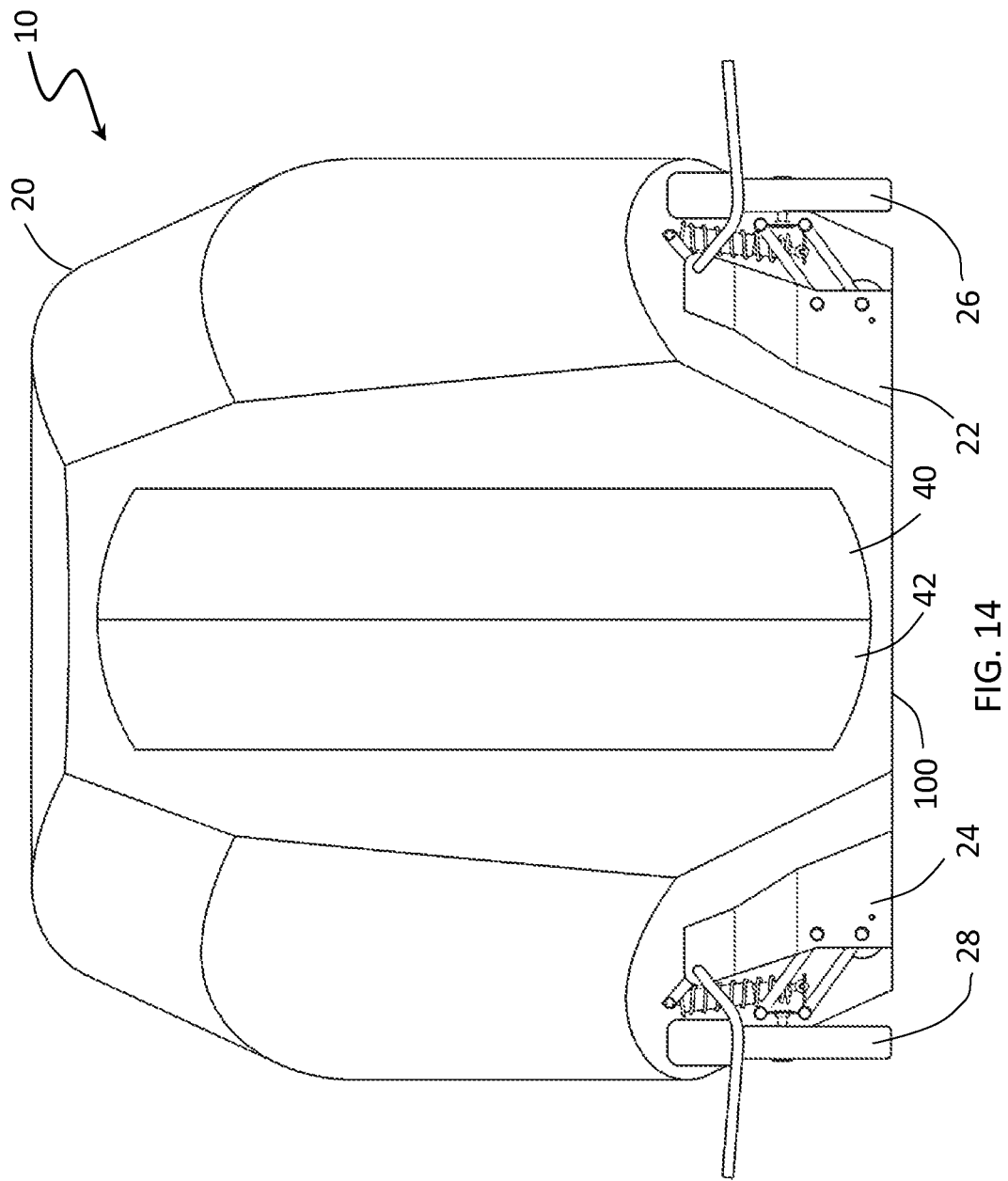
FIG. 14 is a rear view of the recreational utility vehicle of FIG. 1 in which the bottom wall of the recreational utility vehicle is at the ground level elevation.
Figure 15:
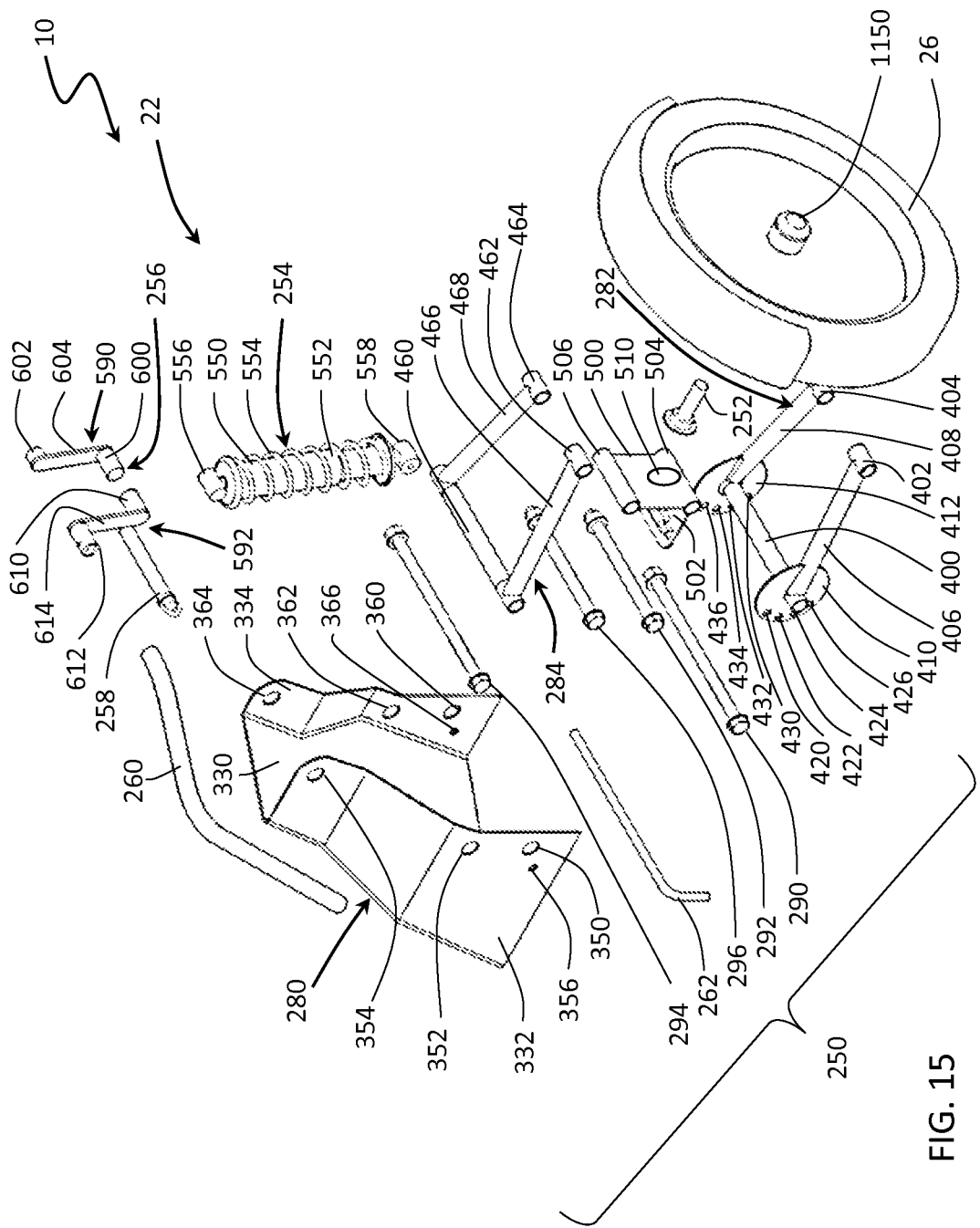
FIG. 15 is an exploded view of a first suspension assembly and a first wheel utilized in the recreational utility vehicle of FIG. 1.

Referring to FIGS. 8 and 15, the swing arm assembly 250 includes a mounting bracket 280, swing arms 282, 284, a mounting member 286, and bolts 290, 292, 294, 296.

The mounting bracket 280 is coupled to the first side wall assembly 102. The mounting bracket 280 includes a bracket plate 330 and bracket walls 332, 334. In an exemplary embodiment, the mounting bracket 280 is constructed of aluminum. The bracket walls 332, 334 extend outwardly from the bracket plate 330 and are spaced apart from one another. The bracket wall 332 includes apertures 350, 352, 354, 356 extending therethrough. Further, the bracket wall 334 includes apertures 360, 362, 364, 366 extending therethrough. The bracket plate 330 is coupled to the first side wall assembly 102.

The swing arm 282 is rotatably coupled to the mounting bracket 280. The swing arm 282 includes first, second, third swing arm tubular members 400, 402, 404, extension arms 406, 408, and ring-shaped plates 410, 412. The ring-shaped plates 410, 412 are coupled to the first swing arm tubular member 400 a predetermined distance from one another. The extension arms 406, 408 are coupled to the ring-shaped plates 410, 412, respectively, and extend outwardly from the ring-shaped plates 410, 412, respectively. The second and third swing arm tubular members 402, 404 are coupled to first and second distal ends, respectively, of the extension arms 406, 408, respectively. The second and third swing arm tubular members 402, 404 are axially aligned with one another. The ring-shaped plate 410 includes apertures 420, 422, 424, 426 extending therethrough for receiving the locking pin 262 therethrough. Further, the ring-shaped plate 412 includes apertures 430, 432, 434, 436 extending therethrough for receiving the locking pin 262 therethrough. In an exemplary embodiment, the swing arm 282 is constructed of aluminum.

The swing arm 284 is rotatably coupled to be mounting bracket 280. The swing arm 284 includes first, second, third swing arm tubular members 460, 462, 464, and extension arms 466, 468. The extension arms 466, 468 are coupled to the first swing arm tubular member 460 and extend outwardly from the swing arm tubular member 460. The first and second swing arm tubular members 462, 464 are coupled to first and second distal ends, respectively, of the extension arms 466, 468, respectively. The second and third swing arm tubular members 462, 464 are axially aligned with one another. In an exemplary embodiment, the swing arm 284 is constructed of aluminum.

The mounting member 286 includes plate portions 500, 502 and tubular members 504, 506. The plate portion 500 has an aperture 510 extending therethrough. The tubular members 504, 506 are disposed on first and second ends, respectively, of the plate portion 500. The plate portion 502 extends from the tubular member 504 substantially perpendicular to the plate portion 500. In an exemplary embodiment, the mounting member 286 is constructed of aluminum. The mounting member 286 is operably coupled to the wheel 26 such that the wheel 26 is rotatable relative to the mounting member 286.

The bolt 290 extends through the aperture 350 in the mounting bracket 280, and further extends through the first swing arm tubular member 400 of the swing arm 282, and further extends through the aperture 360 in the mounting bracket 280—to rotatably couple the swing arm 282 to the mounting bracket 280.

The bolt 292 extends through the second swing arm tubular member 402 of the swing arm 282, and further extends through the tubular member 504 of the mounting member 286, and further extends through the third swing arm tubular member 404 of the swing arm 282—to rotatably couple the swing arm 282 to the mounting member 286.

The bolt 294 extends through the aperture 352 in the mounting bracket 280, and further extends through the first swing arm tubular member 460 of the swing arm 284, and further extends through the aperture 362 in the mounting bracket 280—to rotatably couple the swing arm 284 to the mounting bracket 280.

The bolt 296 extends through the second swing arm tubular member 462 of the swing arm 284, and further extends through the tubular member 506 of the mounting member 286, and further extends through the third swing arm tubular member 464 of the swing arm 284—to rotatably couple the swing arm 284 to the mounting member 286.

The axle pin or bolt 252 extends through the aperture 510 of the mounting member 286 and further extends through an aperture 1150 in the wheel 26—to rotatably couple the wheel 26 to the mounting member 286.

The strut assembly 254 includes body portions 550, 552, a spring 554, and coupling members 556, 558. The body portions 550, 552 are operably coupled together. The spring 554 is disposed around the body portions 550, 552. Further, the coupling member 556 is coupled to the body portion 550, and is further coupled to the rotatable yoke member 256. Further, the coupling member 558 is coupled to the body portion 552, and is further coupled to the mounting member 286.

The rotatable yoke member 256 includes yoke portions 590, 592 and the locking pin 258. The yoke portion 590 has yoke tubular members 600, 602 and a connecting plate 604 connected between the tubular members 600, 602. Further, the yoke portion 592 has yoke tubular members 610, 612 and a connecting plate 614 connected between the tubular members 610, 612. The locking pin 258 extends through the yoke tubular member 610, and further extends through the coupling member 556 of the strut assembly 254, and further extends through the yoke tubular member 600. The locking pin 258 has a first operational position in which the rotatable yoke member 256 has a locked position relative to the strut assembly 254 when transporting the vehicle 10. The locking pin 258 has a second operational position in which the rotatable yoke member 256 is rotatable relative to the strut assembly 254 to rotatably couple the rotatable yoke member 256 to the strut assembly 254. The yoke tubular member 612 extends through the aperture 354 in the mounting bracket 280, and the yoke tubular member 602 extends to the aperture 364 in the mounting bracket 280.

Referring to FIGS. 15 and 16, the rotatable yoke member 256 has a first rotatable position such that the strut assembly 254 has a compressed operational state and the swing arms 282, 284 are positioned upwardly relative to the mounting member 286 such that the mounting bracket 280 and a portion of the bottom wall 100 proximate to the mounting bracket 280 are at the predetermined distance (e.g., a distance greater than 0 inches) from the ground level elevation.

Figure 18:
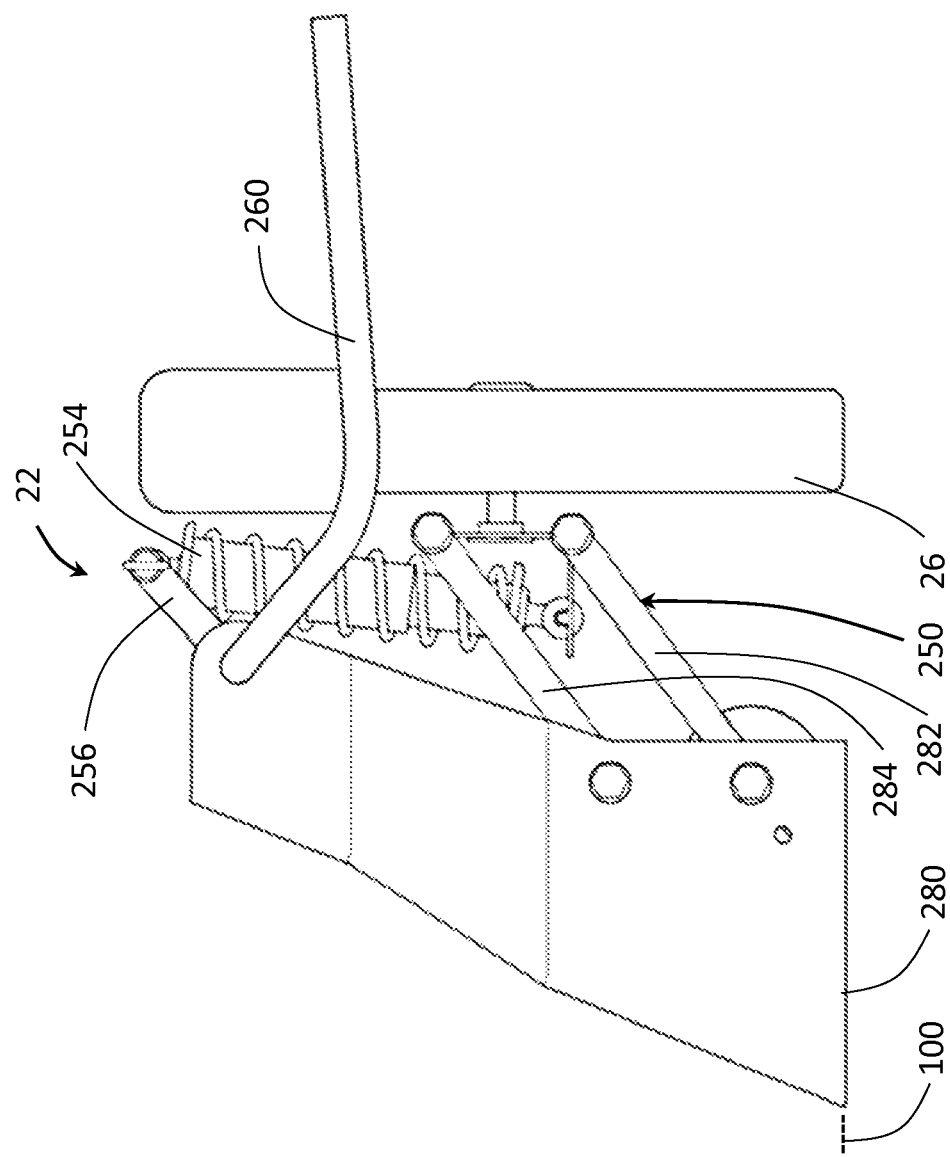
FIG. 18 is a side view of the first suspension assembly and the first wheel when the bottom wall of the recreational utility vehicle of FIG. 1 is at the ground level elevation.

Referring to FIGS. 15 and 18, the rotatable yoke member 256 has a second rotatable position such that the strut assembly 254 has an uncompressed operational state and the swing arms 282, 284 are positioned downwardly relative to the mounting member 286 such that the mounting bracket 280 and a portion of the bottom wall 100 proximate to the mounting bracket 280 are at the ground level elevation.

Referring to FIGS. 15 and 17, the rotatable yoke member 256 has an intermediate position between the first rotatable position and the second rotatable position such that the swing arms 282, 284 are positioned downwardly relative to the mounting member 286 and the mounting bracket 280 and the bottom wall 100 are a relatively small distance from the ground level elevation.

Referring to FIG. 15, the handle 260 is configured to be removably coupled to the yoke tubular member 612 of the rotatable yoke member 256—to allow a user to move the swing arm assembly 250 between the first operational position (shown in FIG. 16) and the second operational position (shown in FIG. 18) and vice versa.

The locking pin 262 is removably received in the aperture 356 of the bracket wall 332, first and second apertures in the ring shaped plates 410, 412, respectively of the swing arm 282, and the aperture 366 in the bracket wall 334—to maintain the swing arm assembly 250 at the first operational position or the intermediate operational position.

Referring to FIGS. 1-12 and 19, the second suspension assembly 24 is coupled directly to the second side wall assembly 104. In an exemplary embodiment, the second suspension assembly 24 includes a swing arm assembly 750, an axle pin 752, a strut assembly 754, a rotatable yoke member 756, a locking pin 758, a handle 760, and a locking pin 762.

Figure 19:
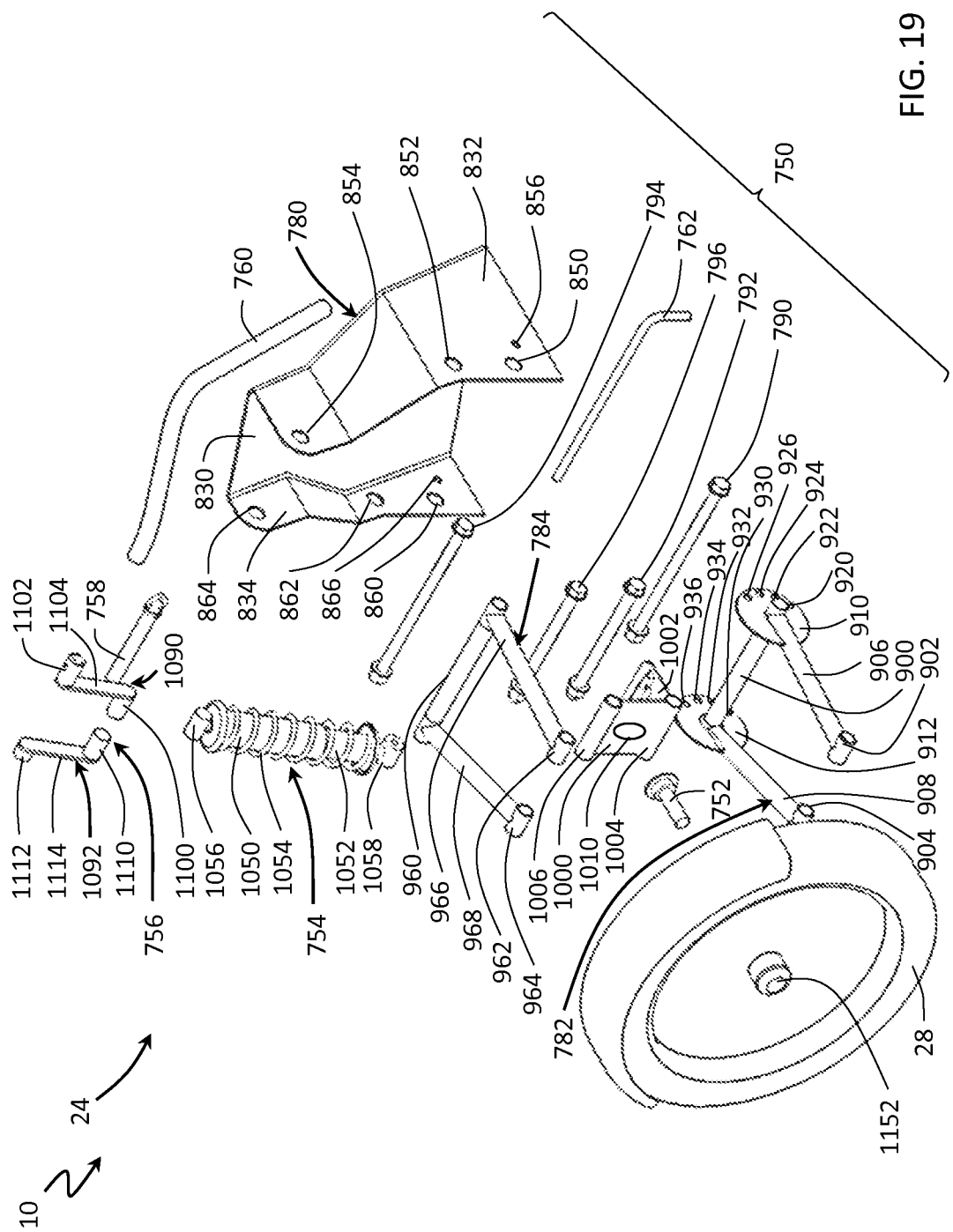
FIG. 19 is an exploded view of a second suspension assembly and a second wheel utilized in the recreational utility vehicle of FIG. 1.
Figure 21:
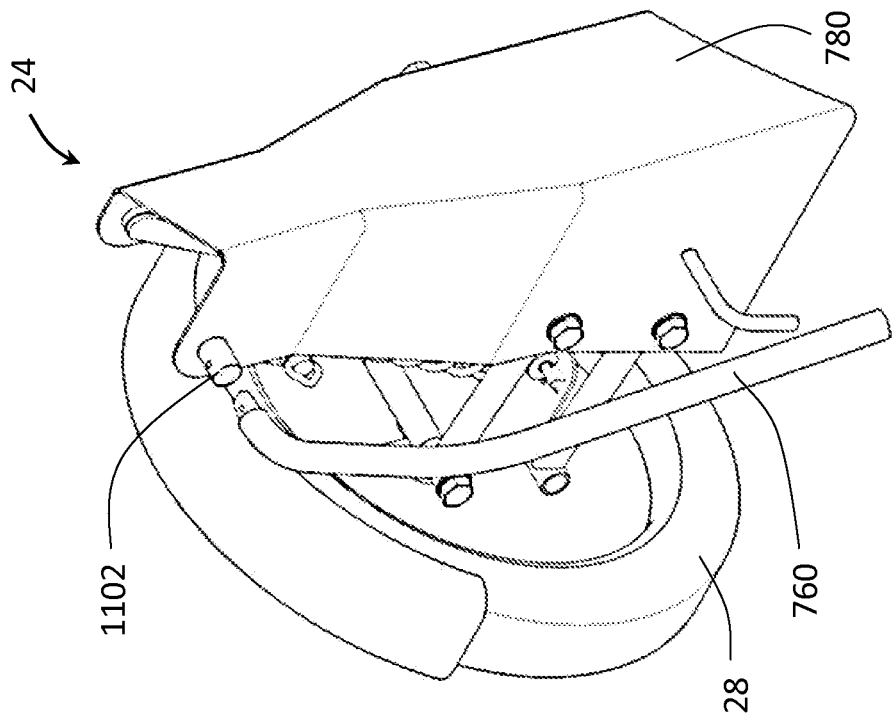
FIG. 21 is another view of the second suspension assembly of FIG. 19.
Figure 20:
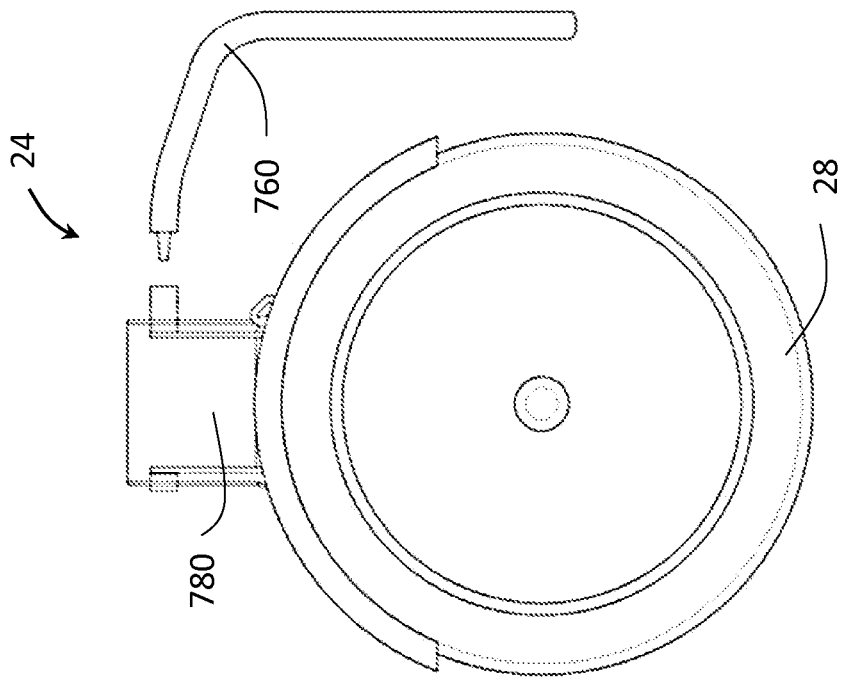
FIG. 20 is a side view of the second suspension assembly of FIG. 19.
Figure 23:
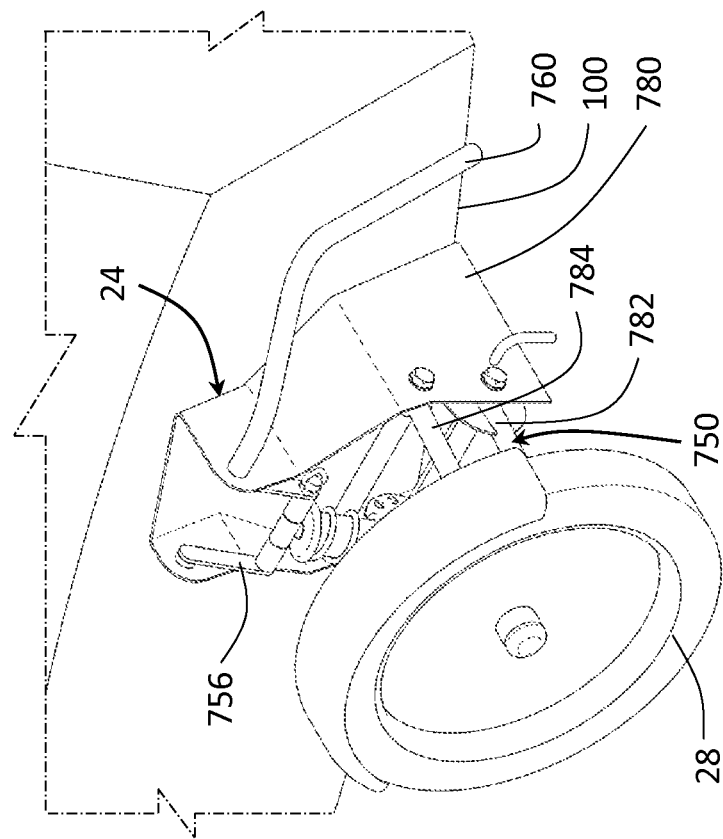
FIG. 23 is an enlarged view of the second suspension assembly of FIG. 20 and the second wheel when the bottom wall of the recreational utility vehicle of FIG. 1 is at the first predetermined distance from the ground level elevation.
Figure 22:
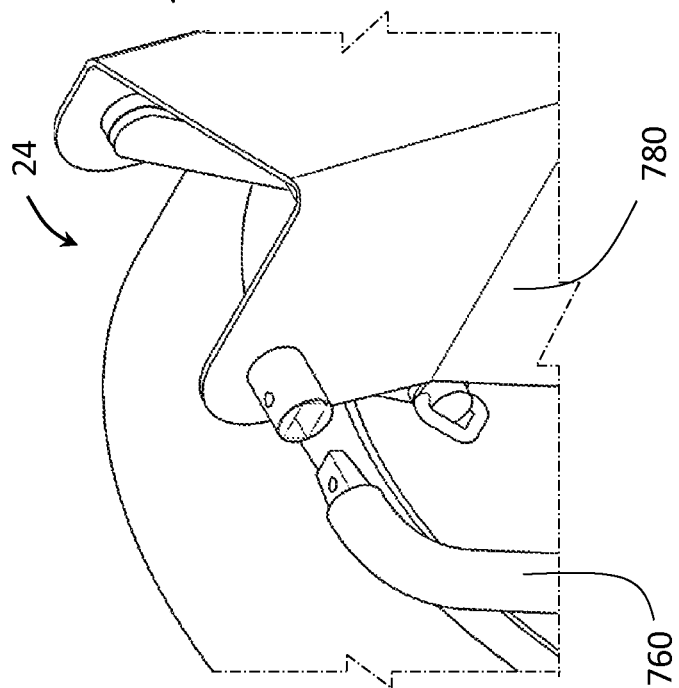
FIG. 22 is an enlarged view of a portion of the second suspension assembly of FIG. 21.
Figure 25:
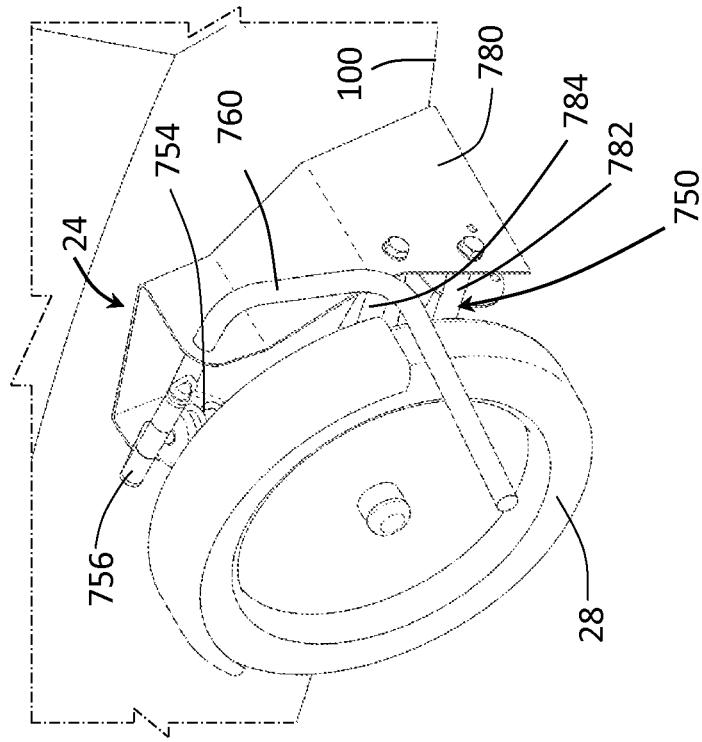
FIG. 25 is an enlarged view of the second suspension assembly of FIG. 20 and the second wheel when the bottom wall of the recreational utility vehicle of FIG. 1 is at the ground level elevation.

Referring to FIGS. 8, 19 and 23, the swing arm assembly 750 has a first operational position in which a portion of the bottom wall 100 of the enclosure 20 proximate to the swing arm assembly 750 is at a first predetermined distance from a ground level elevation. The locking pin 762 is disposed through the apertures 866, 856 of the mounting bracket 780 to lock the swing arm assembly 750 at the first predetermined distance, for stationary use of the vehicle 10. Further, referring to FIGS. 19 and 25, the swing arm assembly 750 has a second operational position in which the portion of the bottom wall 100 proximate to the swing arm assembly 750 is at the ground level elevation. The locking pin 762 can be removed from the apertures 866, 856 of the mounting bracket 780 when the swing arm assembly 750 has the second operational position, for stationary use of the vehicle 10. Still further, referring to FIGS. 19 and 24, the swing arm assembly 750 has an intermediate operational position, between the first and second operational positions, in which the portion of the bottom wall 100 of the enclosure 20 proximate to the swing arm assembly 750 is above the ground level elevation. The locking pin 762 is disposed through the apertures 866, 856 of the mounting bracket 780 to lock the swing arm assembly 750 at the intermediate operational position, for stationary use of the vehicle 10. It is noted that the locking pin 762 is removed from the apertures 866, 856 of the mounting bracket 780, and the locking pin 758 has a locked operational position, when the vehicle 10 is being moved or transported by another motorized vehicle.

Referring to FIGS. 8 and 19, the swing arm assembly 750 includes a mounting bracket 780, swing arms 782, 784, a mounting member 786, and bolts 790, 792, 794, 796.

The mounting bracket 780 is coupled to the second side wall assembly 104. The mounting bracket 780 includes a bracket plate 830 and bracket walls 832, 834. In an exemplary embodiment, the mounting bracket 880 is constructed of aluminum. The bracket walls 832, 834 extend outwardly from the bracket plate 830 and are spaced apart from one another. The bracket wall 832 includes apertures 850, 852, 854, 856 extending therethrough. Further, the bracket wall 834 includes apertures 860, 862, 864, 866 extending therethrough. The bracket plate 830 is coupled to the second side wall assembly 104.

The swing arm 782 is rotatably coupled to the mounting bracket 780. The swing arm 782 includes first, second, third swing arm tubular members 900, 902, 904, extension arms 906, 908, and ring-shaped plates 910, 912. The ring-shaped plates 910, 912 are coupled to the first swing arm tubular member 900 a predetermined distance from one another. The extension arms 906, 908 are coupled to the ring-shaped plates 910, 912, respectively, and extend outwardly from the ring-shaped plates 910, 912, respectively. The second and third swing arm tubular members 902, 904 are coupled to first and second distal ends, respectively, of the extension arms 906, 908, respectively. The second and third swing arm tubular members 902, 904 are axially aligned with one another. The ring-shaped plate 910 includes apertures 920, 922, 924, 926 extending therethrough for receiving the locking pin 762 therethrough. Further, the ring-shaped plate 912 includes apertures 930, 932, 934, 936 extending therethrough for receiving the locking pin 762 therethrough. In an exemplary embodiment, the swing arm 782 is constructed of aluminum.

The swing arm 784 is rotatably coupled to be mounting bracket 780. The swing arm 784 includes first, second, third swing arm tubular members 960, 962, 964, and extension arms 966, 968. The extension arms 966, 968 are coupled to the first swing arm tubular member 960 and extend outwardly from the swing arm tubular member 960. The first and second swing arm tubular members 962, 964 are coupled to first and second distal ends, respectively, of the extension arms 966, 968, respectively. The second and third swing arm tubular members 962, 964 are axially aligned with one another. In an exemplary embodiment, the swing arm 784 is constructed of aluminum.

The mounting member 786 includes plate portions 1000, 1002 and tubular members 1004, 1006. The plate portion 1000 has an aperture 1010 extending therethrough. The tubular members 1004, 1006 are disposed on first and second ends, respectively, of the plate portion 1000. The plate portion 1002 extends from the tubular member 1004 substantially perpendicular to the plate portion 1000. In an exemplary embodiment, the mounting member 786 is constructed of aluminum. The mounting member 786 is operably coupled to the wheel 28 such that the wheel 28 is rotatable relative to the mounting member 786.

The bolt 790 extends through the aperture 850 in the mounting bracket 780, and further extends through the first swing arm tubular member 900 of the swing arm 782, and further extends through the aperture 860 in the mounting bracket 780—to rotatably couple the swing arm 782 to the mounting bracket 780.

The bolt 792 extends through the second swing arm tubular member 902 of the swing arm 782, and further extends through the tubular member 1004 of the mounting member 786, and further extends through the third swing arm tubular member 904 of the swing arm 782—to rotatably couple the swing arm 782 to the mounting member 786.

The bolt 794 extends through the aperture 852 in the mounting bracket 780, and further extends through the first swing arm tubular member 960 of the swing arm 784, and further extends through the aperture 862 in the mounting bracket 780—to rotatably couple the swing arm 784 to the mounting bracket 780.

The bolt 796 extends through the second swing arm tubular member 962 of the swing arm 784, and further extends through the tubular member 1006 of the mounting member 786, and further extends through the third swing arm tubular member 964 of the swing arm 784—to rotatably couple the swing arm 784 to the mounting member 786.

The axle pin or bolt 752 extends through the aperture 1010 of the mounting member 786 and further extends through an aperture 1152 in the wheel 28—to rotatably couple the wheel 28 to the mounting member 786.

The strut assembly 754 includes body portions 1050, 1052, a spring 1054, and coupling members 1056, 1058. The body portions 1050, 1052 are operably coupled together. The spring 1054 is disposed around the body portions 1050, 1052. Further, the coupling member 1056 is coupled to the body portion 1050, and is further coupled to the rotatable yoke member 1056. Further, the coupling member 1058 is coupled to the body portion 1052, and is further coupled to the mounting member 786.

The rotatable yoke member 756 includes yoke portions 1090, 1092 and the locking pin 758. The yoke portion 1090 has yoke tubular members 1100, 1102 and a connecting plate 1104 connected between the tubular members 1100, 1102. Further, the yoke portion 1092 has yoke tubular members 1110, 1112 and a connecting plate 1114 connected between the tubular members 1110, 1112. The locking pin 758 extends through the yoke tubular member 1110, and further extends through the coupling member 1056 of the strut assembly 754, and further extends through the yoke tubular member 1100. The locking pin 758 has a first operational position in which the rotatable yoke member 756 has a locked position relative to the strut assembly 754 when transporting the vehicle 10. The locking pin 758 has a second operational position in which the rotatable yoke member 756 is rotatable relative to the strut assembly 754 to rotatably couple the rotatable yoke member 756 to the strut assembly 754. The yoke tubular member 1102 extends through the aperture 854 in the mounting bracket 780, and the yoke tubular member 1102 extends to the aperture 864 in the mounting bracket 780.

Referring to FIGS. 19 and 23, the rotatable yoke member 756 has a first rotatable position such that the strut assembly 754 has a compressed operational state and the swing arms 782, 784 are positioned upwardly relative to the mounting member 786 such that the mounting bracket 780 and a portion of the bottom wall 100 proximate to the mounting bracket 780 are at the predetermined distance (e.g., a distance greater than 0 inches) from the ground level elevation.

Referring to FIGS. 19, 20, 21, 22 and 25, the rotatable yoke member 756 has a second rotatable position such that the strut assembly 754 has an uncompressed operational state and the swing arms 782, 784 are positioned downwardly relative to the mounting member 786 such that the mounting bracket 780 and a portion of the bottom wall 100 proximate to the mounting bracket 280 are at the ground level elevation.

Figure 24:
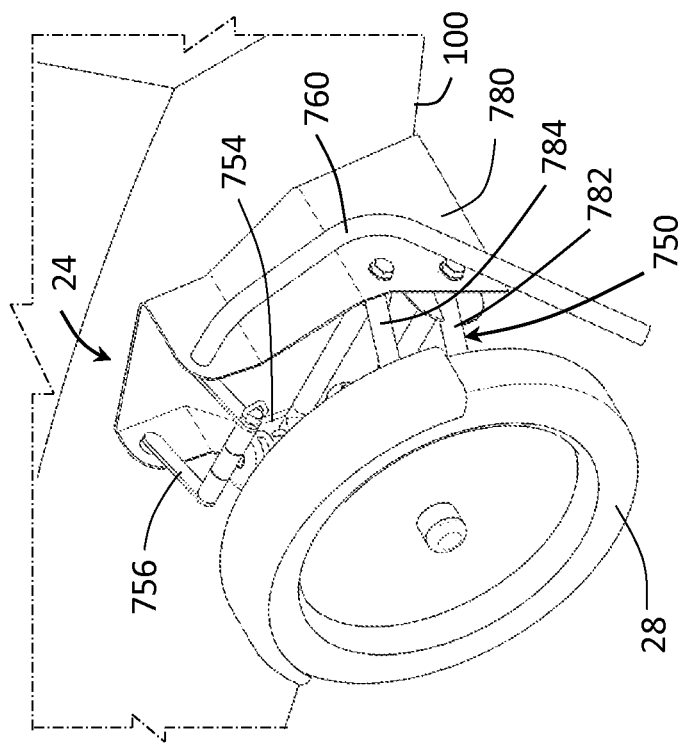
FIG. 24 is an enlarged view of the second suspension assembly of FIG. 20 and the second wheel when the bottom wall of the recreational utility vehicle of FIG. is at the intermediate distance from the ground level elevation.

Referring to FIGS. 19 and 24, the rotatable yoke member 756 has an intermediate position between the first rotatable position and the second rotatable position such that the swing arms 782, 784 are positioned downwardly relative to the mounting member 786 and the mounting bracket 780 and the bottom wall 100 proximate to the mounting bracket 780 are a relatively small distance from the ground level elevation.

The handle 760 is configured to be removably coupled to the yoke tubular member 1102 of the rotatable yoke member 756—to allow a user to move the swing arm assembly 750 between the first operational position (shown in FIG. 23) and the second operational position (shown in FIG. 25) and vice versa.

The locking pin 762 is removably received in the aperture 856 of the bracket wall 832, first and second apertures in the ring-shaped plates 910, 912, respectively of the swing arm 782, and the aperture 866 in the bracket wall 834—to maintain the swing arm assembly 750 at the first operational position or the intermediate operational position.

Referring to FIGS. 1-3, the doors 40, 42 are rotatably coupled to the first and second side wall assemblies 102, 104, respectively. In an exemplary embodiment, a first pair of hinges (not shown) are coupled to and between the door 40 and a vertical edge of the first side wall assembly 102 defined by the doorway 210. Further, a second pair of hinges are coupled to and between the door 42 and a vertical edge of the second side wall assembly 104 defined by the doorway 210. Accordingly, the doors 40, 42 rotate outwardly from the vertical edges of the first and second side wall assemblies 102, 104, respectively, that are defined by the doorway 210.

Also, a first pair of hinges (not shown) are coupled to and between the door 40 and a horizontal edge of the first side wall assembly 102 defined by the doorway 210. Further, a second pair of hinges are coupled to and between the door 42 and a horizontal edge of the second side wall assembly 104 defined by the doorway 210. Accordingly, the doors 40, 42 rotate upwardly from the horizontal edges of the first and second side wall assemblies 102, 104 that are defined by the doorway 210.

Figure 26:
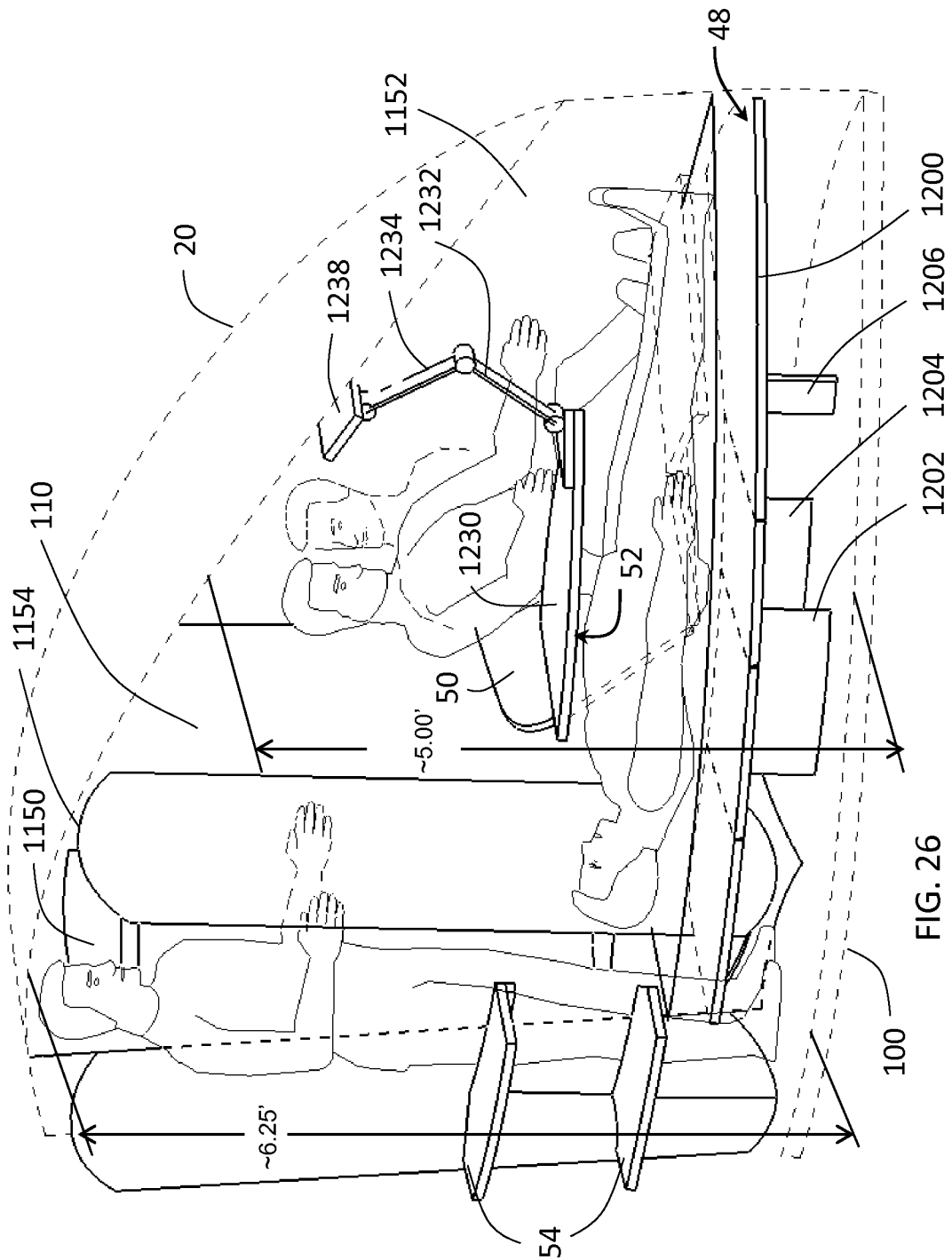
FIG. 26 is a view of an interior region of the recreational utility vehicle of FIG. 1.

Referring to FIGS. 3 and 26, the first and second partition walls 44, 46 are disposed within the interior region 110 and divide the interior region 110 into a first space 1150 and a second space 1152. The partition wall 44 is coupled to the first side wall assembly 102, and the partition wall 46 is coupled to the second side wall assembly 104. Further, the first and second partition walls 44, 46 define a doorway or opening 1154 therebetween that is sized and shaped to allow a human being to walk through the doorway 1154.

Figure 27:
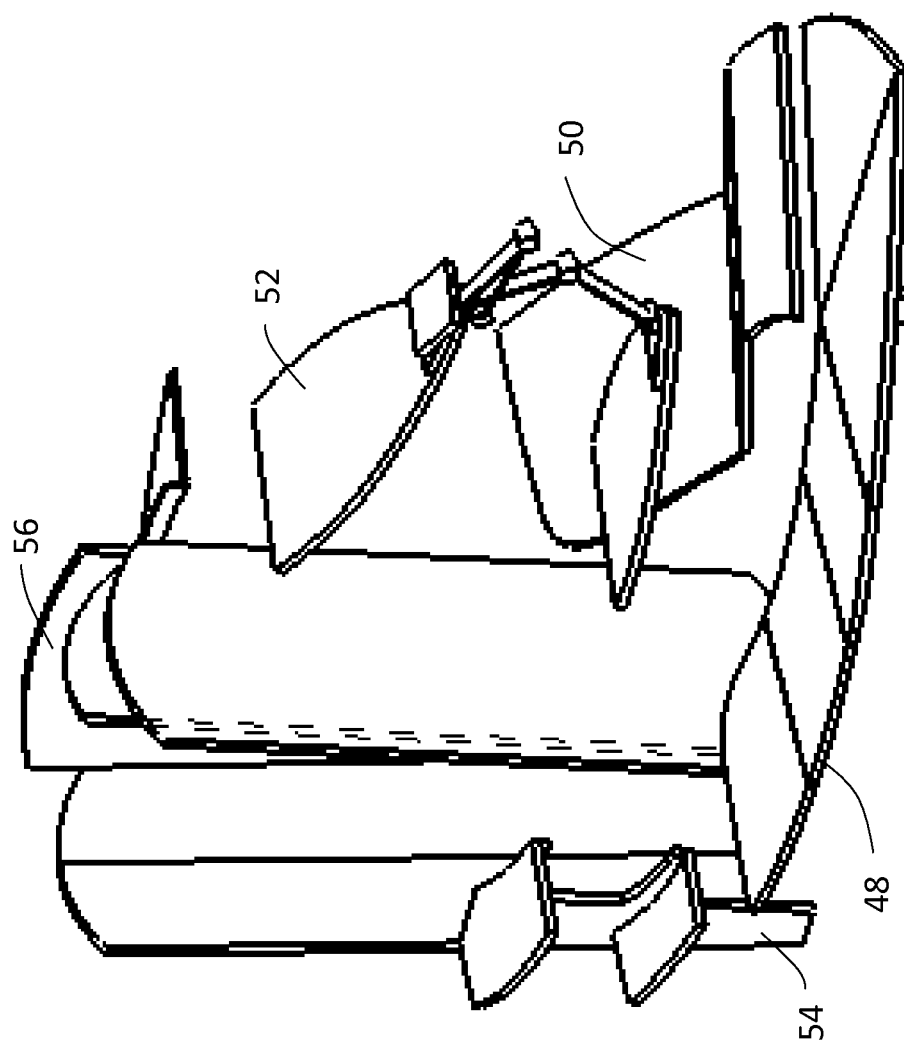
FIG. 27 is a view of a bed assembly, a chair, first and second shelf assemblies, and a closet assembly disposed the interior region of the recreational utility vehicle of FIG. 1.
Figure 30:
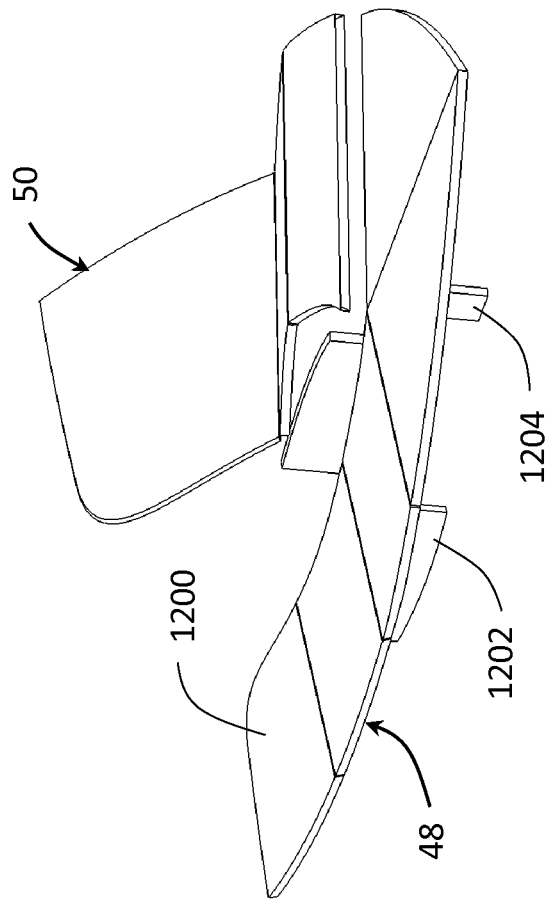
FIG. 30 is an enlarged view of the bed assembly and the chair of FIG. 27.

Referring to FIGS. 26, 27 and 30, the bed assembly 48 is disposed in the second space 1152. The bed assembly 48 is sized and shaped to hold an adult human being thereon. The bed assembly 48 includes a bed plate 1200 and support members 1202, 1204, 1206. The support members 1202, 1204, 1206 are coupled to a bottom side of the bed plate 1200 and are disposed on the bottom wall 100.

The chair 50 is disposed in the second space 1152, and is sized and shaped to hold an adult human being thereon. The chair 50 is disposed a predetermined distance from the bed assembly 48 such that a gap is formed between the chair 50 and the bed assembly 48 for allowing a human being to move therebetween.

Figure 31:
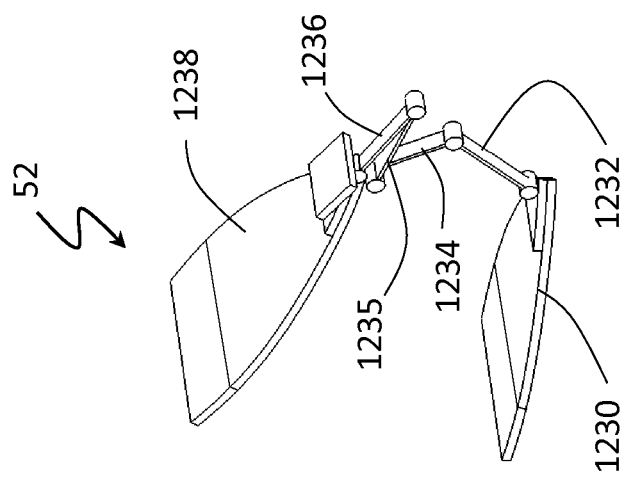
FIG. 31 is an enlarged view of the second shelf assembly of FIG. 27.

Referring to FIGS. 26, 27, and 31, the shelf assembly 52 is disposed in the second space 1152 and is provided to support a portion of an arm of the human being thereon or other articles such as books. The shelf assembly 52 includes a support plate 1230, arm members 1232, 1234, 1235, 1236, and a mounting plate 1238. The arm members 1232, 1234, 1235, 1236 are operably coupled together to couple the support plate 1230 to the mounting plate 1238.

Figure 29:
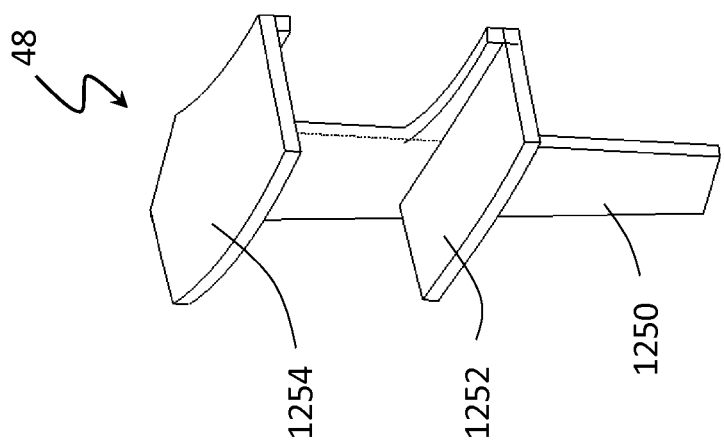
FIG. 29 is an enlarged view of the first shelf assembly of FIG. 27.

Referring to FIGS. 26 and 29, the shelf assembly 54 is disposed in the first space 1150 and is coupled to the first side wall assembly 102. The shelf assembly 54 includes a vertical support member 1250 and shelves 1252, 1254. The shelves 1252, 1254 are coupled to the support member 1250 and disposed apart from one another.

Figure 28:
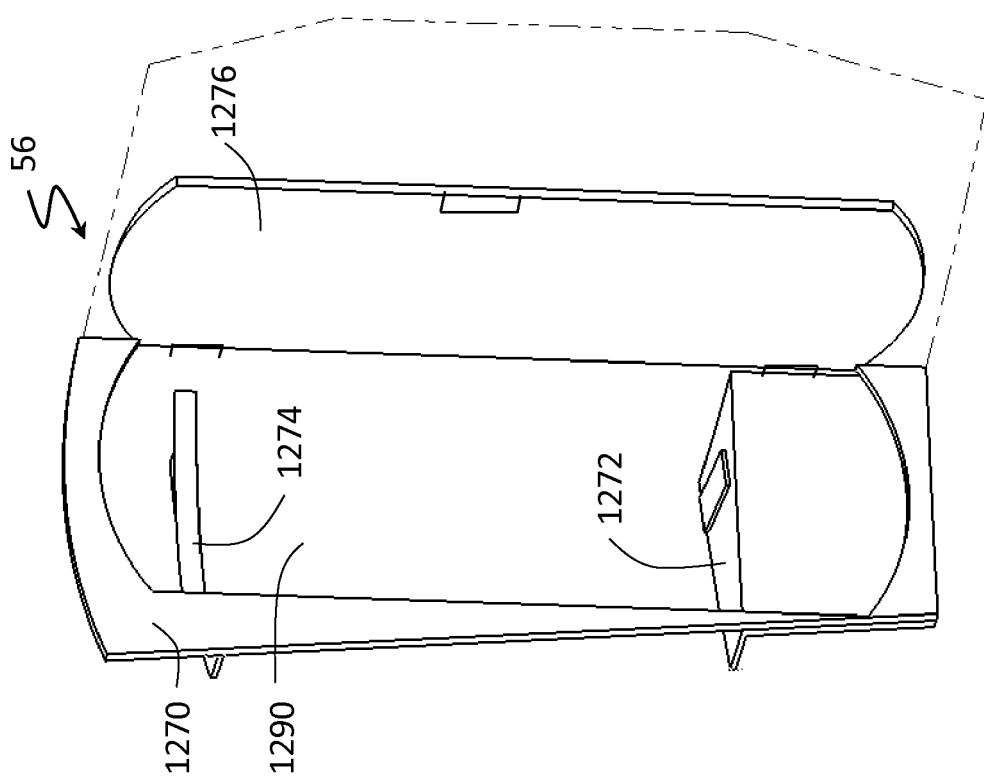
FIG. 28 is an enlarged view of the closet assembly of FIG. 27.

Referring to FIGS. 26 and 28, the closet assembly 56 is disposed within the first space 1150. The closet assembly 56 includes a wall portion 1270, a seat member 1272, a shelf 1274, and a door 1276. The wall portion 1170 defines an opening 1290. The door 1276 is coupled via hinges to the wall portion 1270. The seat member 1272 is sized and shaped to hold a human being thereon.

Figure 32:
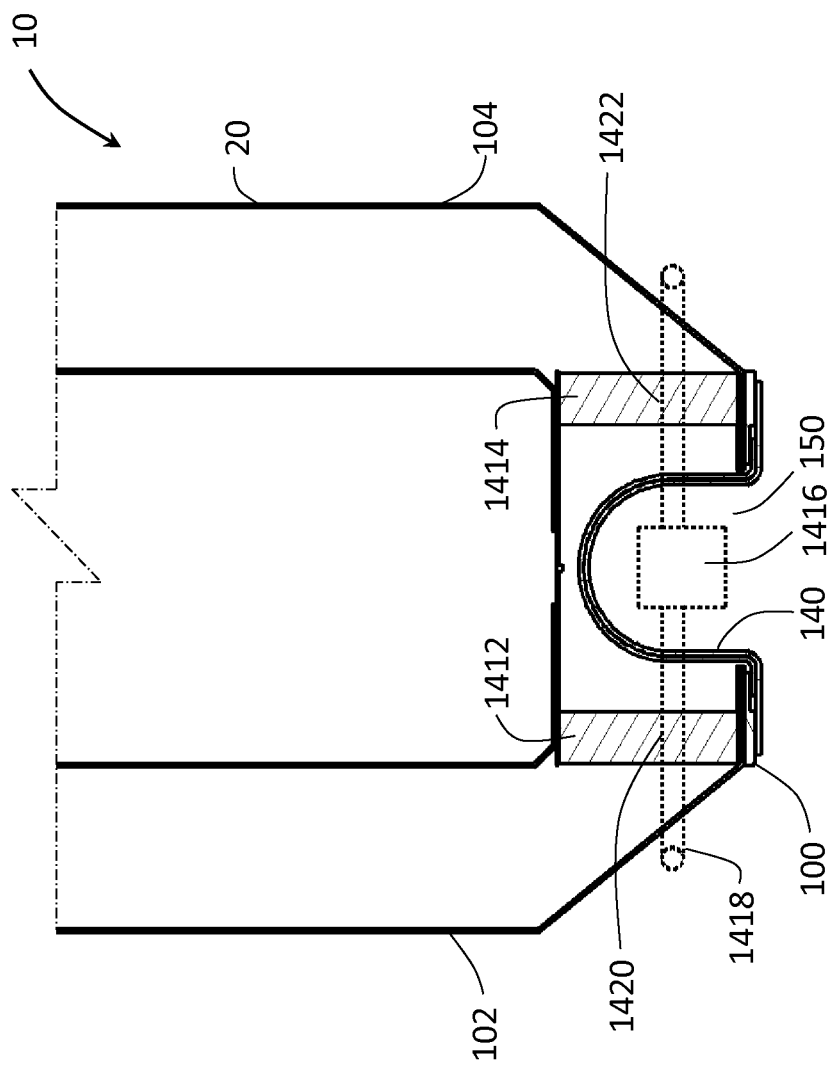
FIG. 32 is a cross-sectional schematic of a portion of the recreational utility vehicle of FIG. 1 illustrating a coupler assembly for coupling the recreational utility vehicle to a ball hitch of a motorized vehicle for transporting the recreational utility vehicle.

Referring to FIG. 32, the coupler assembly 1400 is provided to receive a ball hitch from a motorized vehicle (not shown) for transporting the recreational utility vehicle 10. The coupler assembly 1400 includes a ball cup 1410, tie members 1412, 1414, a ball cup lock plate 1416, and the locking pin 1418. The ball cup 1410 is coupled to the bottom wall 100 of the enclosure 20 and defines the aperture 150 for receiving a ball hitch therein. The tie members 1412, 1414 are coupled to the bottom wall 100 on opposite sides of the ball cup 1410. The tie members 1412, 1414 include apertures 1420, 1422, respectively, extending therethrough for receiving the locking pin 1418 therethrough. The locking pin 1418 is utilized to hold the locking plate 1416 at a predetermined operational position for fixedly holding a ball hitch (not shown) within the ball cup 1410.

Figure 33:
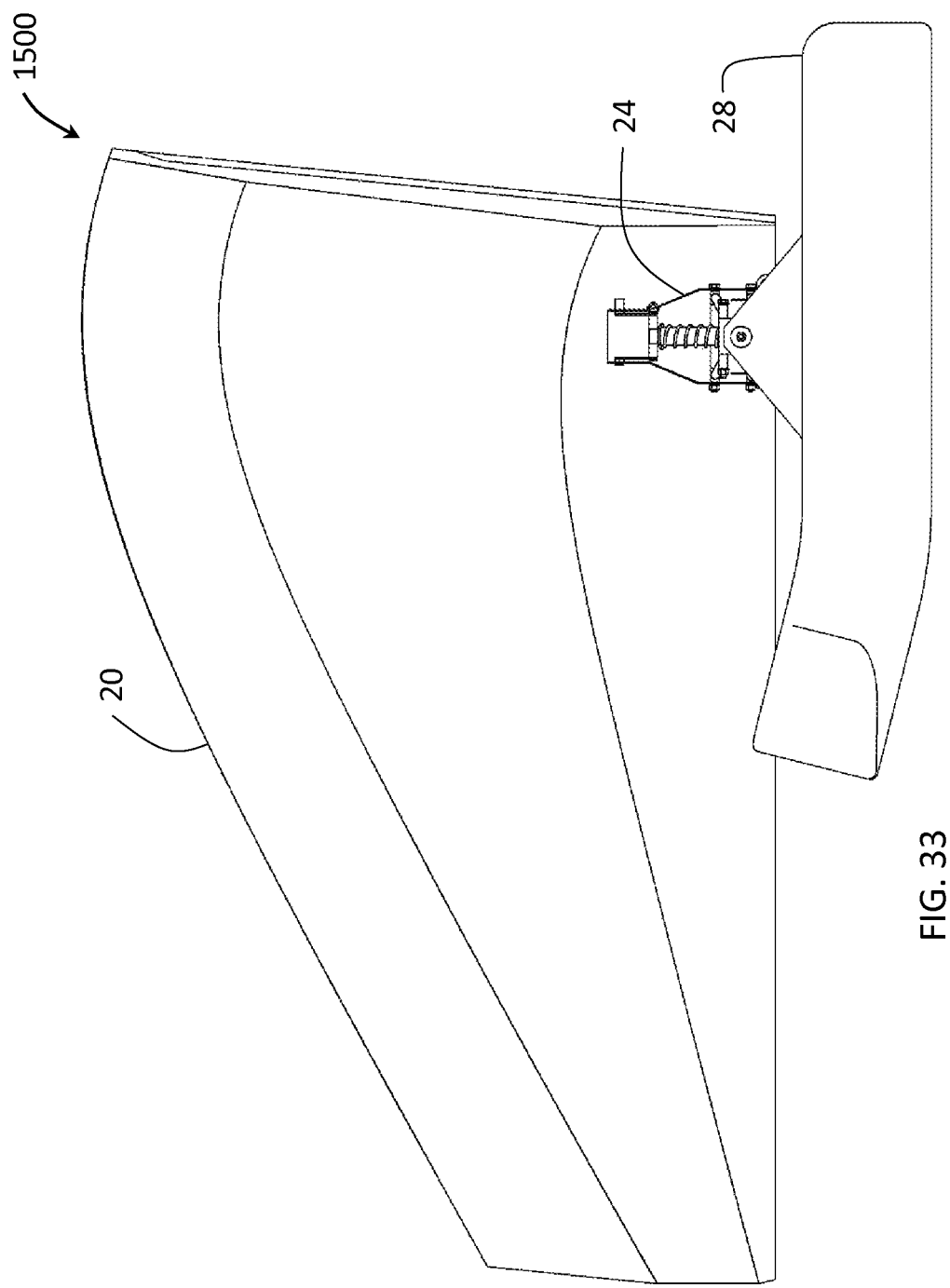
FIG. 33 is a schematic of a recreational utility vehicle having a pair of pontoons disposed thereon in accordance with another exemplary embodiment.
Figure 34:
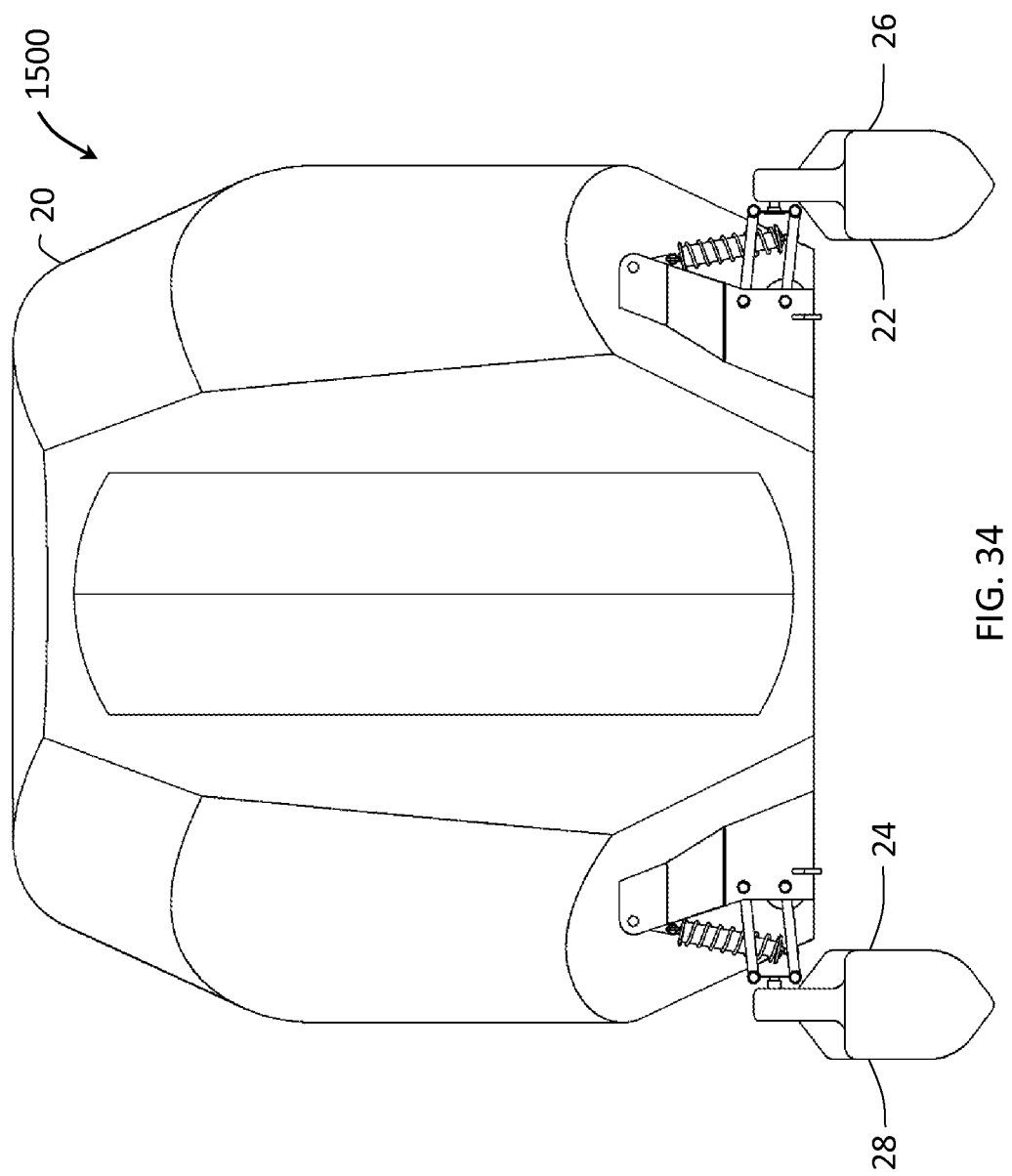
FIG. 34 is a side view of the recreational utility vehicle of FIG. 33.

Referring to FIGS. 33-34, a recreational utility vehicle 1500 in accordance with another exemplary embodiment is illustrated. The recreational utility vehicle 1500 has the enclosure 20 and the first and second suspension assemblies 22, 24 as described above with respect to the vehicle 10. However, the recreational utility vehicle 1500 utilizes pontoons 26, 28 coupled to the first and second suspension assemblies 22, 24, respectively, instead of wheels. The pontoons 26, 28 are configured to allow the recreational utility vehicle 1500 to be transported across the water, snow, or ice. In an exemplary embodiment, the pontoons 26, 28 are constructed of aluminum.

The recreational utility vehicles 10 and 1500 provide a substantial advantage over other recreational utility vehicles. In particular, the recreational utility vehicles 10 and 1500 utilize first and second suspension assemblies 22, 24 to allow a user to lower the enclosure 20 such that a bottom wall of the enclosure 20 contacts the ground for added stability of the vehicle 10 during stationary usage of the vehicles 10 and 1500.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A recreational utility vehicle, comprising:
an enclosure having a bottom wall, a first side wall assembly, and a second side wall assembly; the first and second side wall assemblies and the bottom wall defining an interior region;
a first suspension assembly coupled directly to the first side wall assembly, the first suspension assembly having a first swing arm assembly with a first operational position in which a first portion of the bottom wall of the enclosure is selectively maintained at a first predetermined distance from a ground level elevation, the first swing arm assembly having a second operational position in which the first portion of the bottom wall of the enclosure is selectively maintained at the ground level elevation;
a second suspension assembly coupled directly to the second side wall assembly, the second suspension assembly having second swing arm assembly with a first operational position in which a second portion of the bottom wall of the enclosure is selectively maintained at the first predetermined distance from the ground level elevation, the second swing arm assembly having a second operational position in which the second portion of the bottom wall of the enclosure is selectively maintained at the ground level elevation; and
a first ground engaging member coupled to the first suspension assembly;
a second ground engaging member coupled to the second suspension assembly;
the first swing arm assembly comprises:
a first mounting bracket coupled to the first side wall assembly;
first and second swing arms rotatably coupled to the first mounting bracket;
the first ground engaging member being a first wheel;
a first mounting member operably coupled to the first wheel such that the first wheel is rotatable relative to the first mounting member; the first and second swing arms being further rotatably coupled to the first mounting member;
the first suspension assembly further comprising:
a first strut assembly having first and second body portions and first and second coupling members; the first and second body portions being operably coupled together; the first coupling member being coupled to the first body portion, the second body portion being coupled to the second coupling member, the first body portion being coupled to the first mounting member;
a first rotatable yoke member being rotatably coupled to the second coupling member of the first strut assembly; and
the first rotatably yoke member having a first rotatable position such that the first strut assembly has a compressed operational state and the first and second swing arms are positioned upwardly relative to the first mounting member such that the first mounting bracket and the first portion of the bottom wall are at the first predetermined distance from the ground level elevation.

2. The recreational utility vehicle of claim 1, wherein:
the second ground engaging member comprises a second wheel rotatably coupled to the second suspension assembly.

3. The recreational utility vehicle of claim 1, wherein:
the first swing arm assembly has a third operational position in which the first portion of the bottom wall of the enclosure is selectively maintained at a second predetermined distance from the ground level elevation, the second predetermined distance being less than the first predetermined distance; and
the second swing arm assembly has a third operational position in which the second portion of the bottom wall of the enclosure is selectively maintained at the second predetermined distance from the ground level elevation.

4. The recreational utility vehicle of claim 1, wherein the first rotatable yoke member having a second rotatable position such that the first strut assembly has an uncompressed operational state and the first and second swing arms are positioned downwardly relative to the first mounting member such that the first mounting bracket and the first portion of the bottom wall are at the ground level elevation.

5. The recreational utility vehicle of claim 1, wherein the first mounting bracket having a first bracket plate and first and second bracket walls, the first and second bracket walls extending outwardly from the first bracket plate and being spaced apart from one another.

6. The recreational utility vehicle of claim 5, further comprising a locking pin, the first and second bracket walls having first and second apertures, respectively, extending therethrough, the locking pin being received in the first aperture of the first bracket wall, and first and second apertures in the first swing arm, and the second aperture in the second bracket wall to maintain the first swing arm assembly at the first operational position.

7. The recreational utility vehicle of claim 5, wherein the first mounting member having first and second plate portions and first and second tubular members, the first and second tubular members being disposed on first and second ends, respectively, of the first plate portion, the second plate portion extending from the second tubular member substantially perpendicular to the first plate portion.

8. The recreational utility vehicle of claim 7, further comprising first and second bolts;
the first swing arm having a first swing arm tubular member, first and second extension arms, second and third swing arm tubular members, and first and second ring-shaped plates;
the first and second ring-shaped plates being coupled to the first swing arm tubular member a first distance from one another;
the first and second extension arms being coupled to the first and second ring-shaped plates, respectively, and extending outwardly from the first and second ring-shaped plates, respectively;
the second and third swing arm tubular members being coupled to first and second distal ends, respectively, of the first and second extension arms, respectively; the second and third swing arm tubular members being axially aligned with one another;
the first bolt extending through a first aperture in the first bracket wall, the first swing arm tubular member, and a second aperture in the second bracket wall; and
the second bolt extending through the second swing arm tubular member, the second tubular member of the first mounting member, and the third swing arm tubular member.

9. The recreational utility vehicle of claim 8, further comprising third and fourth bolts;
the second swing arm having a fourth swing arm tubular member, third and fourth extension arms, and fifth and sixth swing arm tubular members;
the third and fourth extension arms being coupled to the fourth swing arm tubular member and extending outwardly from the fourth swing arm tubular member;
the fifth and sixth swing arm tubular members being coupled to first and second distal ends, respectively, of the third and fourth extension arms, respectively; the fifth and sixth swing arm tubular members being axially aligned with one another;
the third bolt extending through a third aperture in the first bracket wall, the fourth swing arm tubular member, and a fourth aperture in the second bracket wall; and
the fourth bolt extending through the fifth swing arm tubular member, the first tubular member of the first mounting member, and the sixth swing arm tubular member.

10. The recreational utility vehicle of claim 1, further comprising an axle pin coupled to the first plate portion of the first mounting member, the axle pin being further operably coupled to the first wheel such that the first wheel is rotatable relative to the axle pin.

11. The recreational utility vehicle of claim 1, wherein:
the first rotatable yoke member having first and second yoke portions and a yoke pin;
the first yoke portion having first and second yoke tubular members and a first connecting plate; the first and second yoke tubular members being coupled to first and second ends, respectively, of the first connecting plate;
the second yoke portion having third and fourth yoke tubular members and a second connecting plate; the third and fourth yoke tubular members being coupled to first and second ends, respectively, of the second connecting plate;
the yoke pin removably extending through the first and third yoke tubular members of the first and second yoke portions, respectively, and the second coupling member of the first strut assembly; and
the first yoke tubular member extending through another aperture in the first bracket wall.

12. The recreational utility vehicle of claim 11, further comprising a handle operably coupled to the first yoke tubular member.

13. The recreational utility vehicle of claim 1, further comprising first and second partition walls disposed within the interior region, the first and second partition walls dividing the interior region into first and second spaces.

14. The recreational utility vehicle of claim 13, wherein the first space has a vertical height of at least six feet, and the second space has a vertical height in a range of 3-5 feet.

15. The recreational utility vehicle of claim 13, wherein the first and second partition walls define a doorway therebetween.

16. The recreational utility vehicle of claim 13, further comprising a bed assembly being disposed within the second space, the bed assembly being sized and shaped to hold a human body thereon.

17. The recreational utility vehicle of claim 13, further comprising a shelving assembly attached to the first side wall assembly within the second space.

18. The recreational utility vehicle of claim 13, further comprising a closet assembly disposed in the first space.

19. The recreational utility vehicle of claim 1, wherein the first and second side wall assemblies define a doorway therebetween.

20. The recreational utility vehicle of claim 19, further comprising first and second doors being disposed proximate to the doorway, the first and second doors being rotatably coupled to the first and second side wall assemblies, respectively.

21. The recreational utility vehicle of claim 1, further comprising a coupler assembly coupled to the bottom wall of the enclosure, the coupler assembly being sized and shaped to receive a ball hitch therein.

22. A recreational utility vehicle, comprising:
an enclosure having a bottom wall, a first side wall assembly, and a second side wall assembly; the first and second side wall assemblies and the bottom wall defining an interior region;
a first suspension assembly coupled directly to the first side wall assembly, the first suspension assembly having a first swing arm assembly with a first operational position in which a first portion of the bottom wall of the enclosure is selectively maintained at a first predetermined distance from a ground level elevation, the first swing arm assembly having a second operational position in which the first portion of the bottom wall of the enclosure is selectively maintained at the ground level elevation;
a second suspension assembly coupled directly to the second side wall assembly, the second suspension assembly having second swing arm assembly with a first operational position in which a second portion of the bottom wall of the enclosure is selectively maintained at the first predetermined distance from the ground level elevation, the second swing arm assembly having a second operational position in which the second portion of the bottom wall of the enclosure is selectively maintained at the ground level elevation;
the first swing arm assembly comprising:
a first mounting bracket coupled to the first side wall assembly;

first and second swing arms rotatably coupled to the first mounting bracket;

a first mounting member operably coupled to a first wheel such that the first wheel is rotatable relative to the first mounting member; the first and second swing arms being further rotatably coupled to the first mounting member;

the first suspension assembly further comprising:

a first strut assembly having first and second body portions and first and second coupling members; the first and second body portions being operably coupled together; the first coupling member being coupled to the first body portion, the second body portion being coupled to the second coupling member, the first body portion being coupled to the first mounting member;

a first rotatable yoke member being rotatably coupled to the second coupling member of the first strut assembly; and the first rotatable yoke member having a first rotatable position such that the first strut assembly has a compressed operational state and the first and second swing arms are positioned upwardly relative to the first mounting member such that the first mounting bracket and the first portion of the bottom wall are at the first predetermined distance from the ground level elevation.

* * * * *